(12) United States Patent
Han

(10) Patent No.: US 11,204,150 B1
(45) Date of Patent: Dec. 21, 2021

(54) OPTICAL LENS AND LIGHT EMITTING MODULE

(71) Applicant: YEJIA OPTICAL TECHNOLOGY(GUANGDONG) CORPORATION, Dongguan (CN)

(72) Inventor: Jung Hyun Han, Dongguan (CN)

(73) Assignee: YEJIA OPTICAL TECHNOLOGY (GUANGDONG) CORPORATION, Dongguan (CN)

( * ) Notice: Subject to any disclaimer, the term of this patent is extended or adjusted under 35 U.S.C. 154(b) by 0 days.

(21) Appl. No.: 17/172,374

(22) Filed: Feb. 10, 2021

(30) Foreign Application Priority Data

Aug. 26, 2020 (KR) .................. 10-2020-0108054

(51) Int. Cl.
*F21V 5/00* (2018.01)
*F21V 5/04* (2006.01)
*G02B 3/04* (2006.01)
*G02B 3/00* (2006.01)

(52) U.S. Cl.
CPC ............... *F21V 5/046* (2013.01); *G02B 3/04* (2013.01); *G02B 2003/0093* (2013.01)

(58) Field of Classification Search
CPC ...... F21V 5/046; G02B 3/04; G02B 2003/0093
See application file for complete search history.

(56) References Cited

U.S. PATENT DOCUMENTS

2016/0327239 A1* 11/2016 Lin ................. G02B 5/0231
2017/0234507 A1* 8/2017 Kang .................. F21V 5/046
362/237
2019/0063695 A1* 2/2019 Oh ........................ F21K 9/69

* cited by examiner

*Primary Examiner* — Anne M Hines
(74) *Attorney, Agent, or Firm* — Locke Lord LLP; Tim Tingkang Xia, Esq.

(57) ABSTRACT

The invention discloses an optical lens and a light emitting module having the same. The optical lens includes an incident surface around a recess in a center of the bottom surface; a light exit surface for emitting light incident; and a flange portion disposed between the light exit surface and a second edge of the bottom surface. A bottom of the recess has a width in a first axis direction that is greater than a width in a second axis direction orthogonal to the first axis direction. An outer diameter of the bottom surface has a length in the first axis direction that is smaller than a length in the second axis direction. The bottom surface includes a first rough region around the recess and second and third rough regions around the first rough region.

32 Claims, 15 Drawing Sheets

OPTICAL LENS AND LIGHT EMITTING MODULE

CROSS-REFERENCE TO RELATED PATENT APPLICATION

This application claims priority to Korean Patent Application No. 10-2020-018054 filed in South Korea on Aug. 26, 2020. The disclosure of the above application is incorporated herein in its entirety by reference.

TECHNICAL FIELD

The present disclosure relates to an optical lens, a light emitting module, and a light unit.

BACKGROUND ART

A light emitting device, for example, a light emitting diode, is a type of a semiconductor device which converts electrical energy into light. The light emitting diode replaces an existing fluorescent lamp, incandescent lamp, or the like and is considered as a next-generation light source.

Since the light emitting diode generates light by using a semiconductor element, the light emitting diode consumes very low power, as compared to an incandescent lamp which generates light by heating tungsten or a fluorescent lamp which generates light by colliding ultraviolet rays generated through high pressure discharge with a phosphor.

Also, since the light emitting diode generates light by using a potential gap of the semiconductor element, the light emitting diode has a long lifespan, a fast response time, and environment-friendly characteristics, as compared to the existing light source.

Accordingly, much research has been conducted to replace the existing light source with a light emitting diode. The light emitting diode is increasingly used as a light source of a lighting apparatus such as various lamps used indoor and outdoor, a display device, an electronic board, a streetlamp, and the like.

The light emitted from the LED has a strong linearity and is thus condensed in a direction facing the emission surface of the LED. There is an increasing demand for technology to effectively and uniformly diffuse the light of these LEDs. It is also necessary to symmetrically and uniformly diffuse the light emitted from the LED, but depending on the arrangement of the LEDs, a lens that diffuses the light diffusion distribution in different directions is required.

SUMMARY

An embodiment provides an optical lens of an anisotropic form.

An embodiment of the invention provides an optical lens that provides a wider light diffusion distribution in one of two axial directions perpendicular to each other.

An embodiment of the invention may provide an optical lens capable of improving luminance distribution at a center of the lens by providing a reflective pattern and a rough region on a bottom surface and a flange portion, and a light emitting module having the same.

An embodiment of the invention provides an optical lens and a light emitting module having the same in which the luminance distribution of light in the first axis direction arranged along a circuit board is wider than the luminance distribution in the second axis direction.

An embodiment of the invention provides an optical lens and a light emitting module having the same in which a length of an exit surface in the first axis direction arranged along the circuit board is smaller than a length of an exit surface in the second axis direction, and a bottom length of a recess in the first axis direction is greater than a bottom length in the second axis direction.

An optical lens according to an embodiment of the invention includes a bottom surface; a recess concave in a center region of the bottom surface; an incident surface around the recess; a light exit surface for emitting light incident through the incident surface; and a flange portion disposed between the light exit surface and a second edge of the bottom surface, wherein a bottom of the recess is that a width in a first axis direction passing through a bottom center of the recess is greater than a length in a second axis direction passing through the bottom center the recess, an outer diameter of the bottom surface is that a length in the first axis direction passing through the bottom center of the recess is smaller than a length in the second axis direction passing through the bottom center of the recess, wherein the bottom surface is a first rough region around the recess, and a second and third rough regions around the first rough region, wherein a surface roughness of the first rough region has a value smaller than a surface roughenss of the second and third rough regions, and wherein the bottom surface includes a first reflective pattern adjacent to the flange portion rather than the recess, the incident surface extends in a curved surface from a first edge at a lower end of the incident surface to a first vertex, and the incident surface includes a convex portion adjacent to the first vertex than the first edge and having a convex curved surface in the optical axis direction.

According to an embodiment of the invention, wherein the first reflective pattern has a plurality of grooves having a curved shape and is disposed in a range of 60% to 80% in a radial direction of the optical lens from the center of the bottom surface, and the first to third rough regions may be a surface which is a corrosion-treated surface, the second rough region may be disposed between the first reflective pattern and the first rough region, and the third rough region may be disposed between the first reflective pattern and the second edge of a lower end of the flange portion.

According to an embodiment of the invention, the flange portion has a second reflective pattern in which a plurality of grooves is arranged in a ring shape around a lower circumference and an outer rough region having a rough surface around an upper circumference, and a surface roughness of the outer rough region may be higher than a surface roughness of the first rough region.

According to an embodiment of the invention, the bottom surface may have an oval shape, a bottom shape of the recess may have an oval shape, and the first reflective pattern may be a discontinuous groove shape or a continuous circular groove shape.

According to an embodiment of the invention, a plurality of support protrusions protruding from the bottom surface may be included, and the plurality of support protrusions may be disposed closer to the first reflective pattern than the recess.

According to an embodiment of the invention, the bottom surface has a lowest first edge located at the lower end of the recess and a second edge located at the lower end of the flange portion is higher than the first edge, and the bottom surface may include a concave portion along an inner side of the first reflection pattern.

According to an embodiment of the invention, the light exit surface may have a concave center portion overlapping the bottom of the recess in a vertical direction and a convex curved surface around an outer circumference of the center portion.

According to an embodiment of the invention, the convex portion is disposed in a range of 60% to 73% of a depth of the recess, and the convex portion is disposed on both sides of the first axis direction with respect to the optical axis passing through the bottom center of the recess, and the depth of the recess may be formed to be 75% or more of a thickness of the optical lens.

According to an embodiment of the invention, the flange portion has a maximum width in a direction perpendicular to the a second axis direction relative to the optical axis, a minimum width in a direction perpendicular to the first axis direction, and the width of the flange portion is may be gradually reduced as the distance increases along an outer circumferential surface from an outer surface in the first and second axial directions.

According to an embodiment of the invention, a side protrusion protruding outward from the flange portion in the first axis direction may be included.

A light emitting module according to an embodiment of the invention includes: a circuit board; a plurality of light emitting devices disposed on the circuit board and emitting light; and a plurality of optical lenses arranged along the circuit board and disposed on each of the plurality of light emitting devices, wherein a width of the circuit board in the second axis direction is smaller than a length in the first axis direction, wherein the optical lens includes an optical lens of the claims 1 and 2, and the plurality of optical lenses are arranged along the first axial direction of the circuit board, the width of the circuit board in the second axis direction is smaller than the length in the second axis direction of each of the optical lenses, and a part of the first reflective pattern may be exposed to an outside of the second axis direction of the circuit board.

According to an embodiment of the invention, the bottom surface of the optical lens is an elliptical shape, a bottom shape of the recess is an elliptical shape, the first reflective pattern is a continuous or discontinuous groove shape, and the optical lens includes a plurality of support protrusions protruding from the bottom surface thereof, and the plurality of support protrusions may be disposed closer to the first reflective pattern than the recess.

According to an embodiment of the invention, the bottom surface of the optical lens has a lowest first edge at the lower end of the recess and a second edge at the lower end of the flange portion is located higher than the first edge, and the circuit board has a reflective layer thereon and a distance between the circuit board and the first edge may be minimum, and a distance between the circuit board and the second edge may be maximum.

According to an embodiment of the invention, the light exit surface has a concave center portion overlapping a bottom of the recess in a vertical direction and a convex curved surface at an outer circumference of the center portion, and a convex portion having a convex curved surface around an upper circumference of the incident surface may be disposed in a range of 60% to 73% of a depth of the recess, the convex portion is disposed on both sides of the first axis direction with respect to the optical axis passing through a bottom center of the recess, the depth of the recess may be formed to 75% or more of a thickness of the optical lens.

According to an embodiment of the invention, a side protrusion protruding outward from the flange portion in the first axis direction may be included, and the flange portion of the optical lens has a plurality of grooves arranged in a ring shape around a lower circumference thereof and an outer rough region having a rough surface around an upper circumference thereof, and a surface roughness of the outer rough region may be located higher than a surface roughness of a first rough region disposed on a bottom surface of the optical lens.

According to an embodiment of the invention, a luminance distribution in one of two axial directions orthogonal to each other in an optical lens may be provided wider than a luminance distribution in the other axial direction. In addition, optical interference between optical lenses arranged on a circuit board can be reduced and the number of lenses can be reduced.

According to an embodiment of the invention, noise such as hot spots caused by light emitted from an optical lens may be reduced, luminance unevenness (e.g. Mura effects) may be suppressed, and light luminance distribution may be uniformly provided. According to an embodiment of the invention, an image may be improved by minimizing interference between adjacent optical lenses, and reliability of a light emitting module and a light unit having an optical lens may be improved.

BRIEF DESCRIPTION OF THE DRAWINGS

The following accompanying drawings of the present invention are used here as part of the present invention to understand the present invention. Embodiments of the present invention and their descriptions are shown in the accompanying drawings to explain the principles of the present invention. In the accompanying drawings.

DETAILED DESCRIPTION

Figure 1:
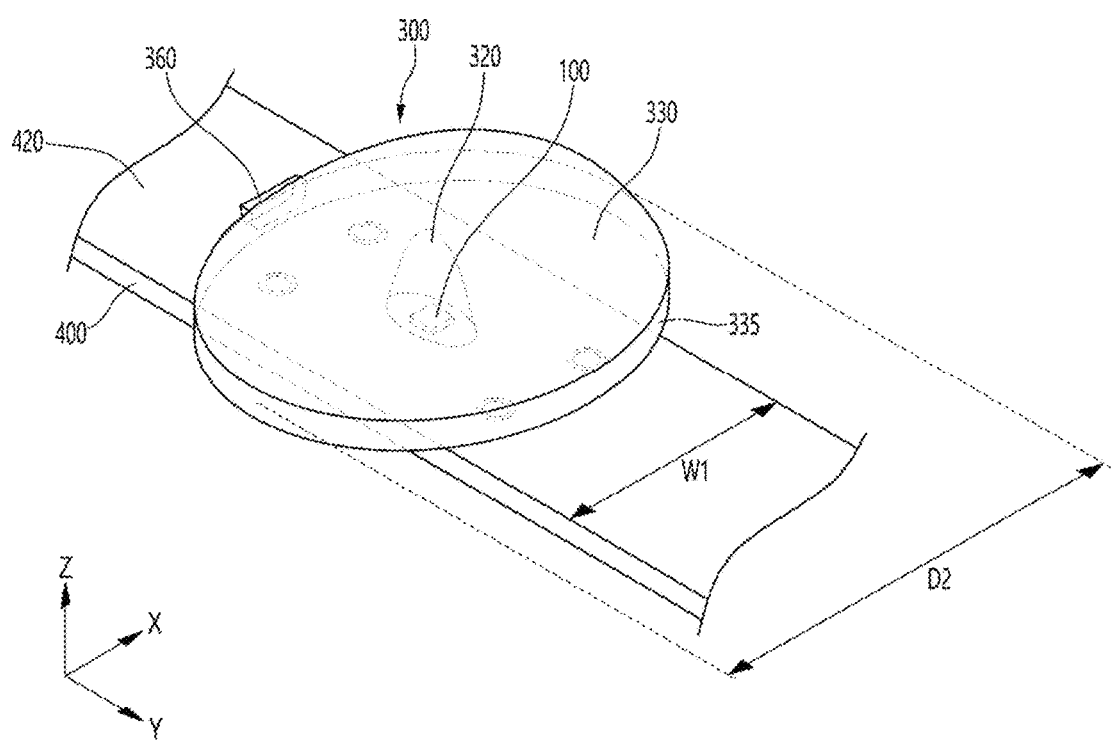
FIG. 1 is a perspective view of a light emitting module having an optical lens on a circuit board according to an embodiment of the invention.

Reference will now be made in detail to the embodiments of the present disclosure, examples of which are illustrated in the accompanying drawings. Advantages and features of the present invention, and a method of achieving them will be apparent with reference to the embodiments described below in detail together with the accompanying drawings. However, the present invention is not limited to the embodiments to be published below, but may be implemented in various different forms. It is provided to fully inform the scope of the invention to those who have it, and the invention is only defined by the scope of the claims. The same reference numerals refer to the same components throughout the specification.

In the description of the embodiments, in the case in which each layer (film), area, pad or pattern is described as being formed "on" or "under" each layer (film), area, pad or pattern, the "on" and "under" include both of forming "directly" and "indirectly". Also, the reference for determining "on" or "under" each layer will be described based on the figures.

Hereinafter, optical lenses and light emitting modules including the same according to embodiments will be described with reference to the accompanying drawings.

Figure 2:
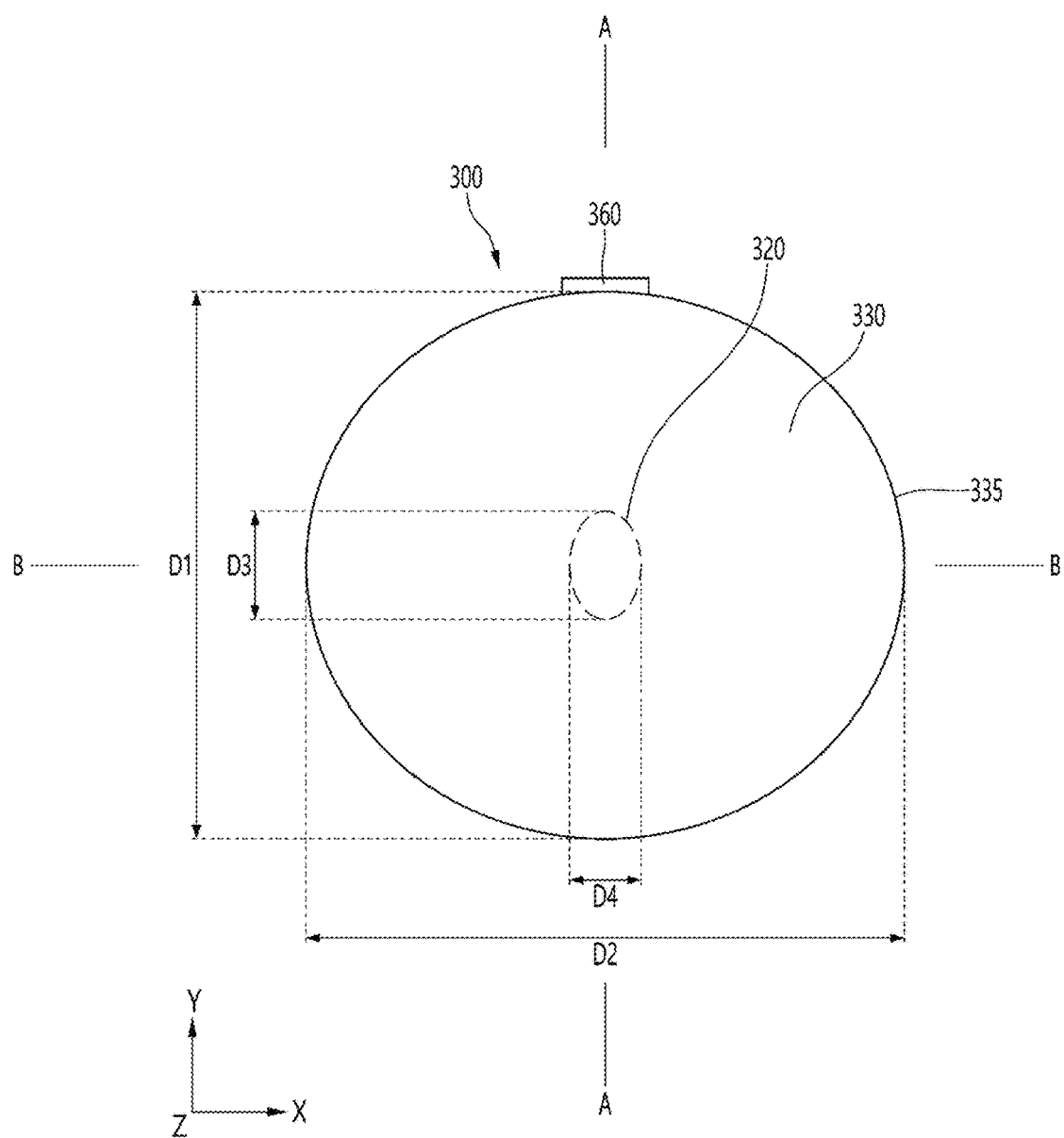
FIG. 2 is a plan view of an optical lens in FIG. 1.
Figure 3:
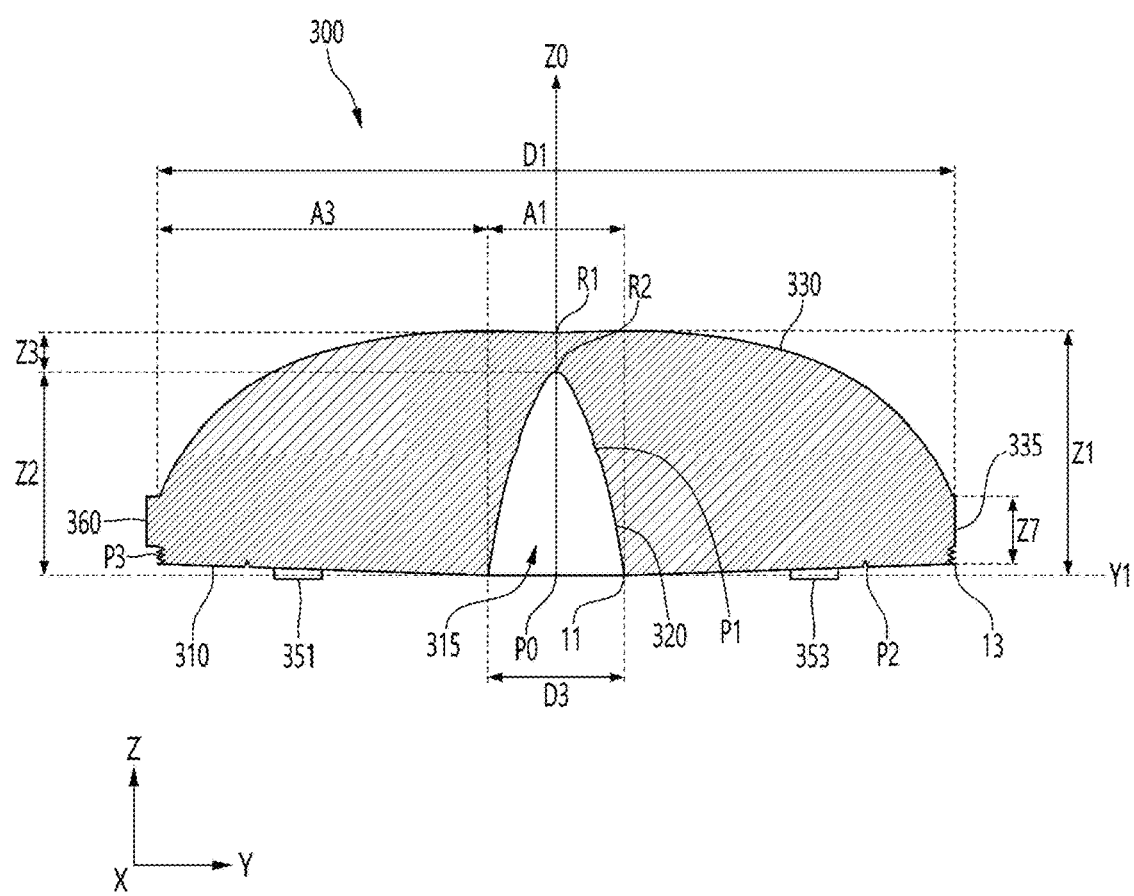
FIG. 3 is a cross-sectional view on a A-A side of the optical lens of FIG. 2.
Figure 4:
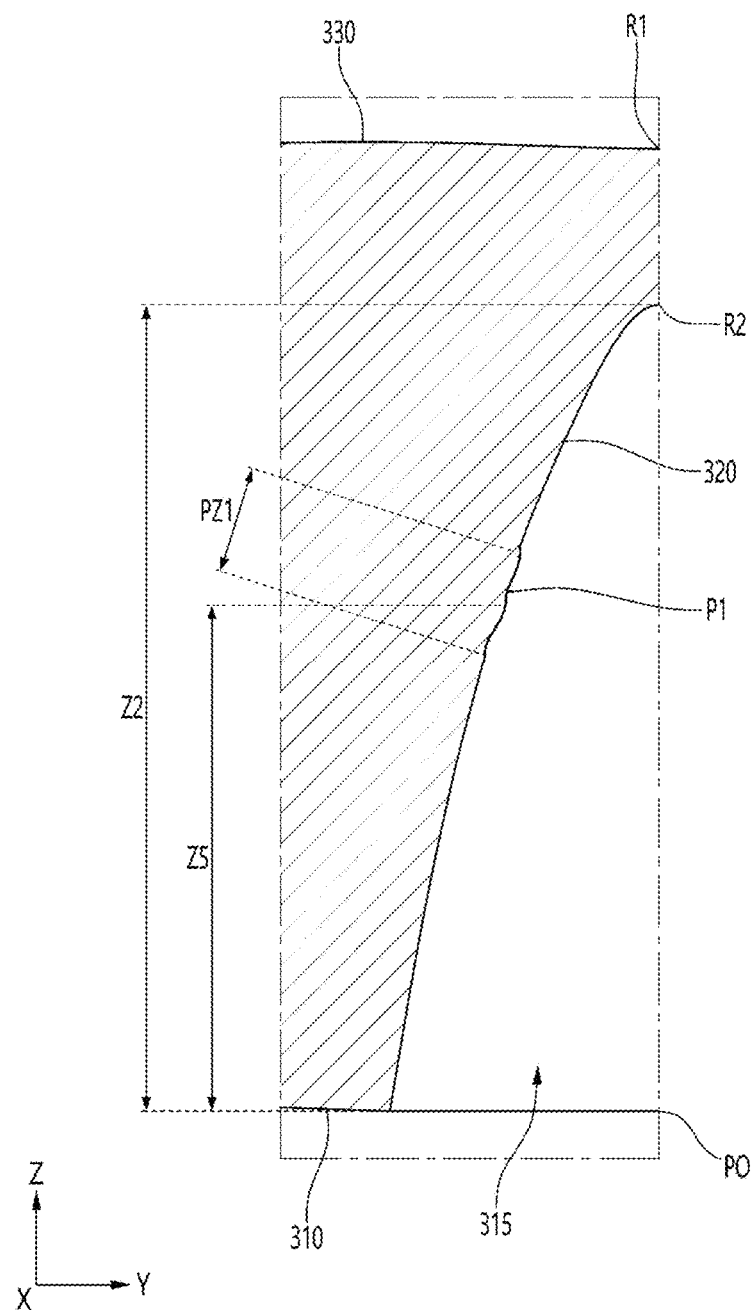
FIG. 4 is a partially enlarged view of the incident surface of the recess of FIG. 3.
Figure 5:
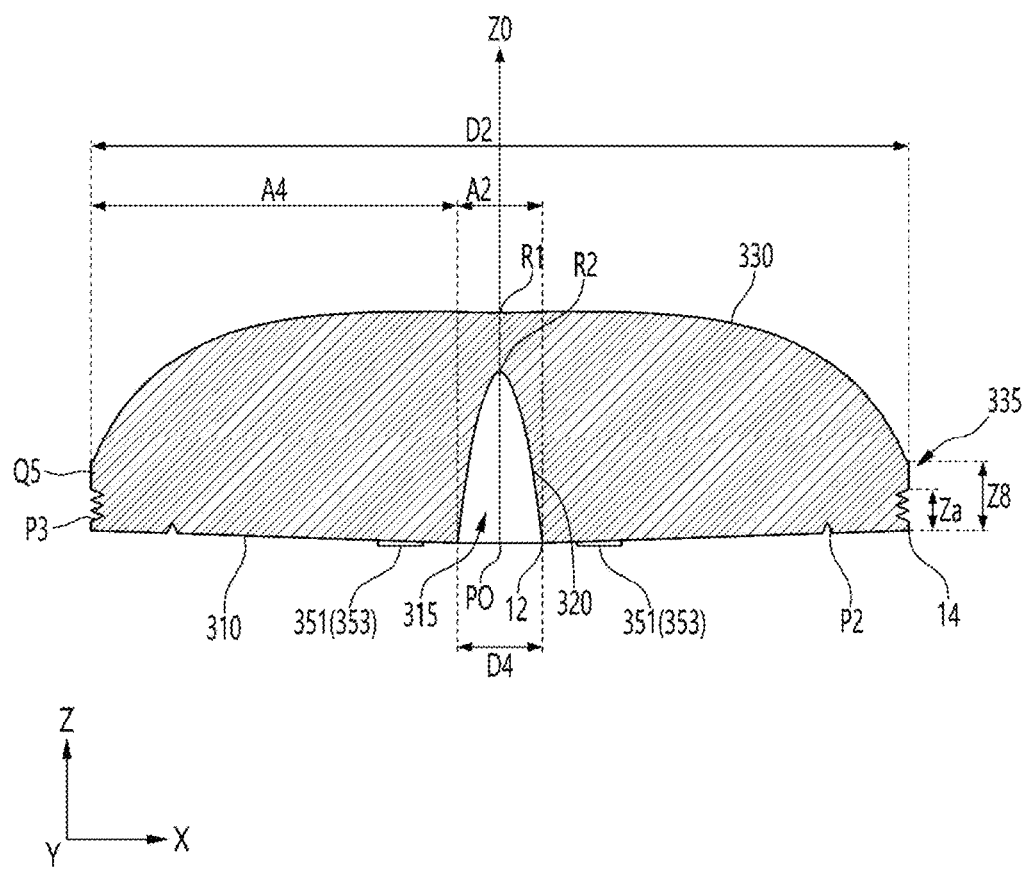
FIG. 5 is a cross-sectional view on a B-B side of the optical lens of FIG. 2.
Figure 6:
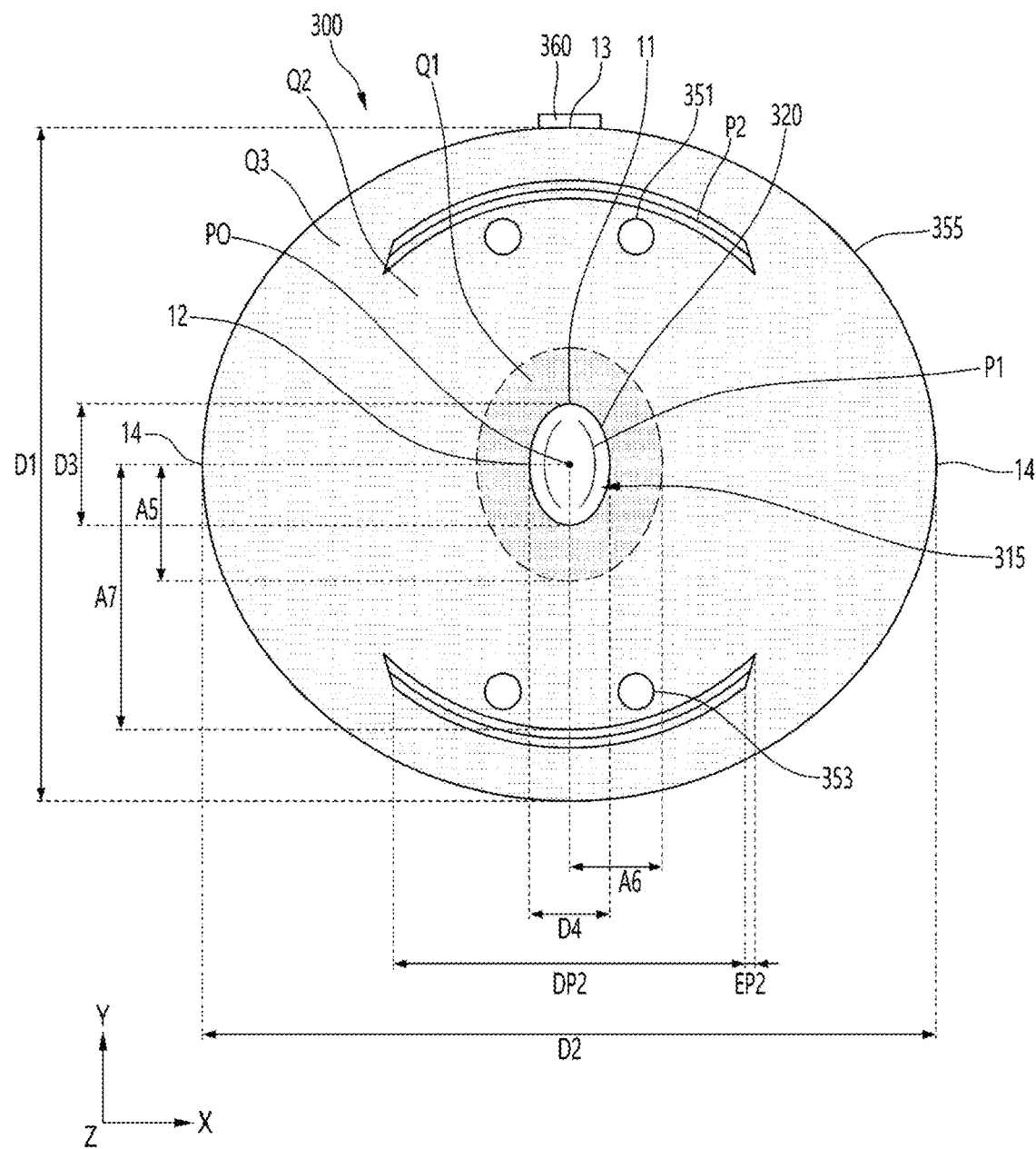
FIG. 6 is a bottom view of the optical lens of FIG. 2.
Figure 7:
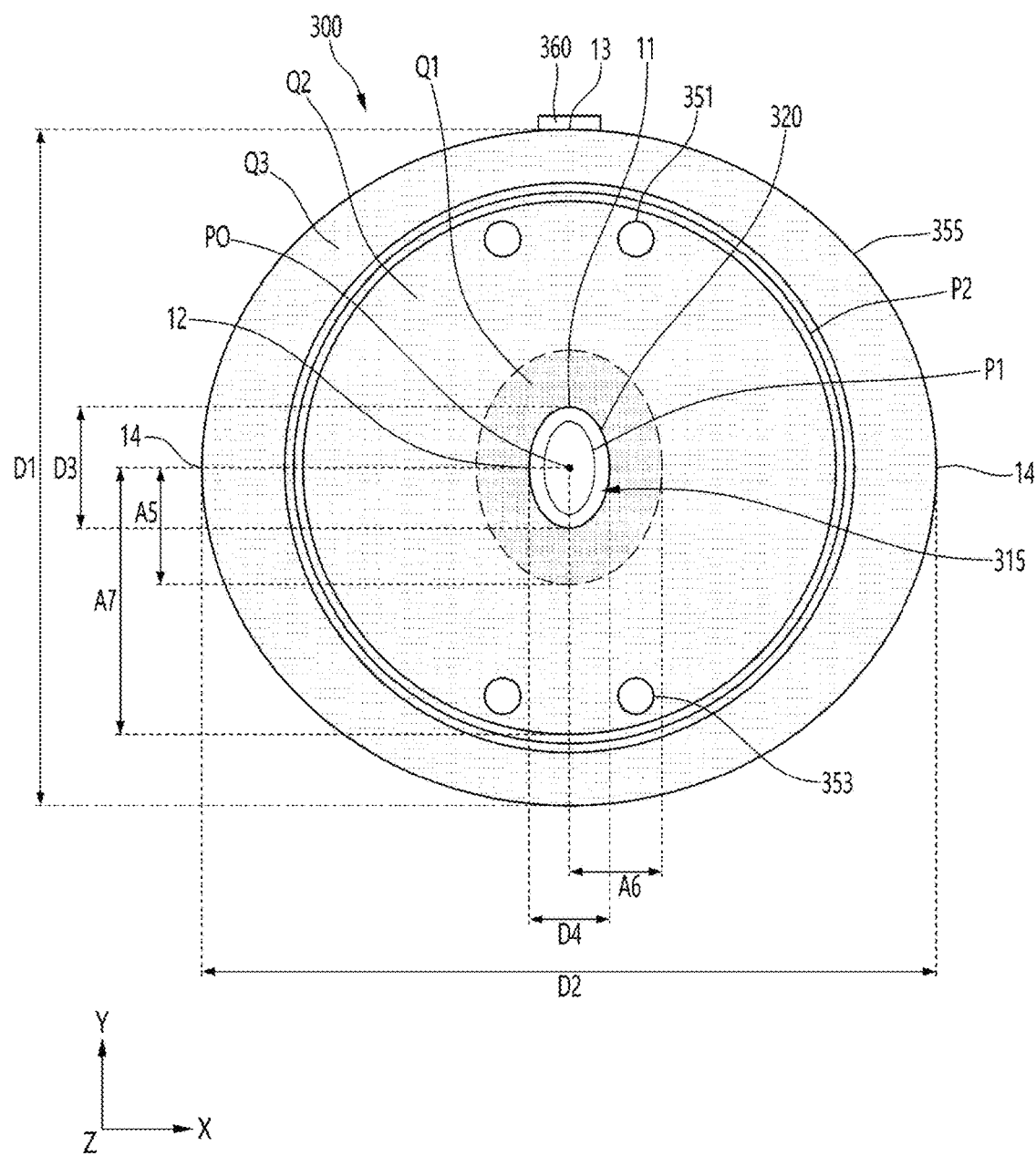
FIG. 7 is another example of a second pattern in the bottom view of the optical lens of FIG. 2.
Figure 8:
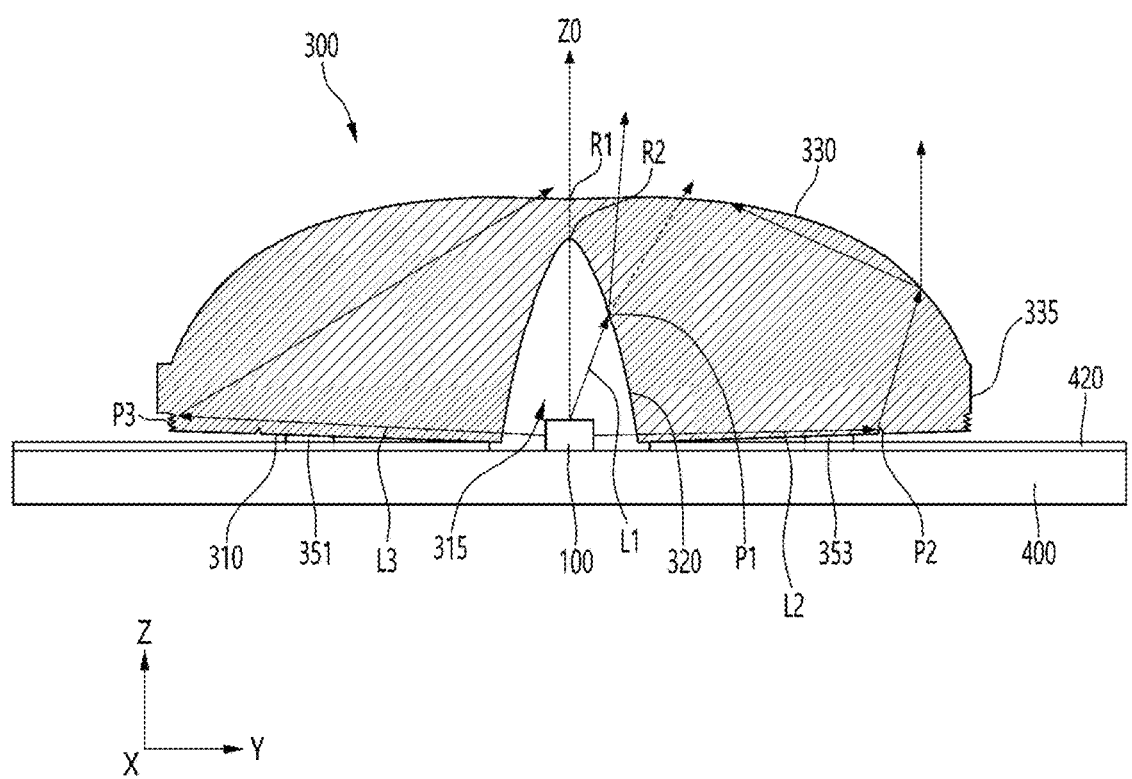
FIG. 8 is a cross-sectional view in which the optical lens of FIG. 3 is disposed on the circuit board.
Figure 9:
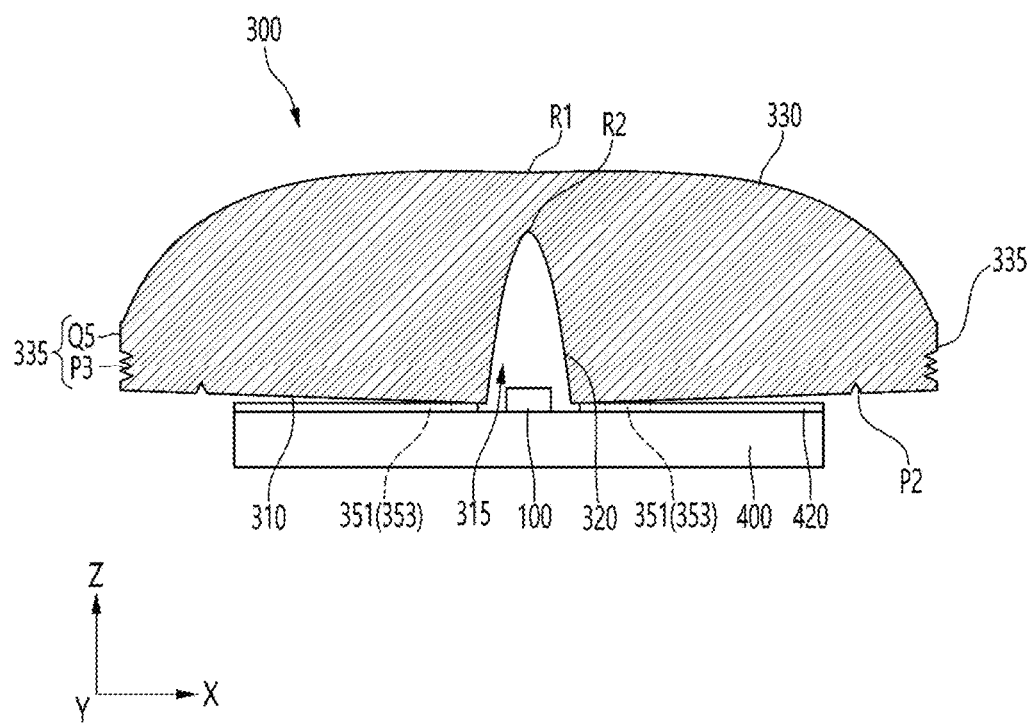
FIG. 9 is a cross-sectional view in which the optical lens of FIG. 5 is disposed on the circuit board.
Figure 10:
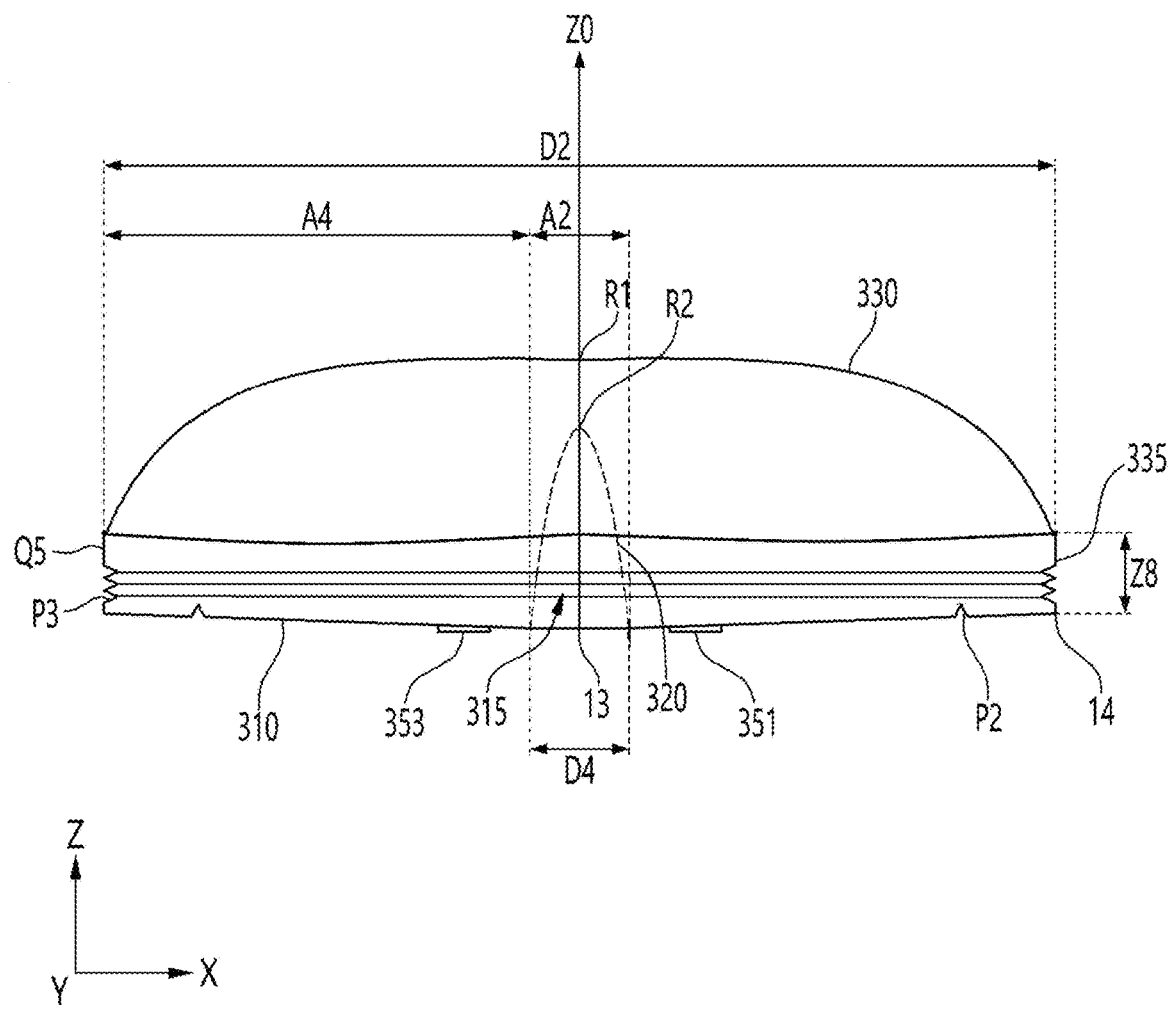
FIGS. 10 and 11 are side views showing another example of a flange portion of an optical lens according to an embodiment of the invention.
Figure 11:
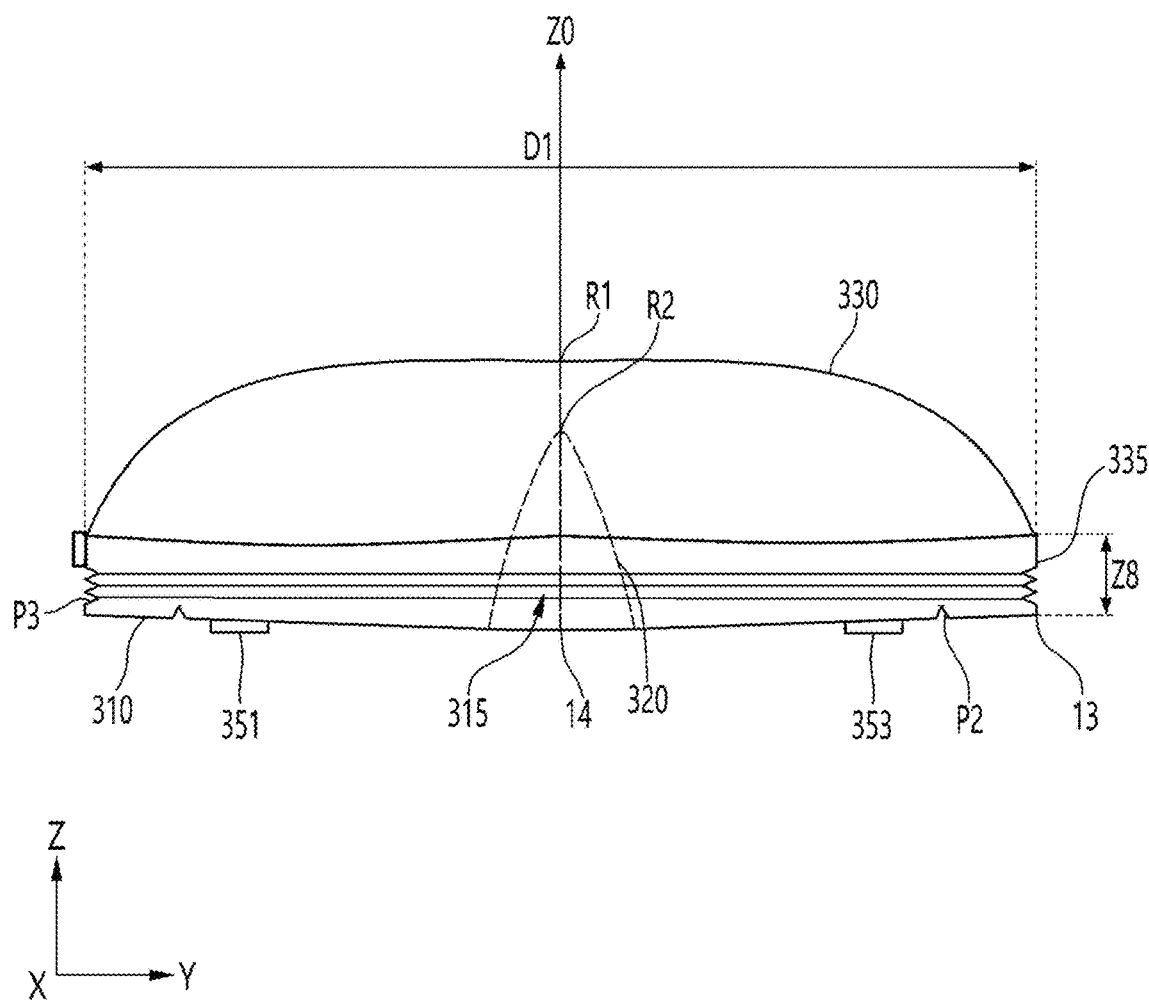
Figure 12:
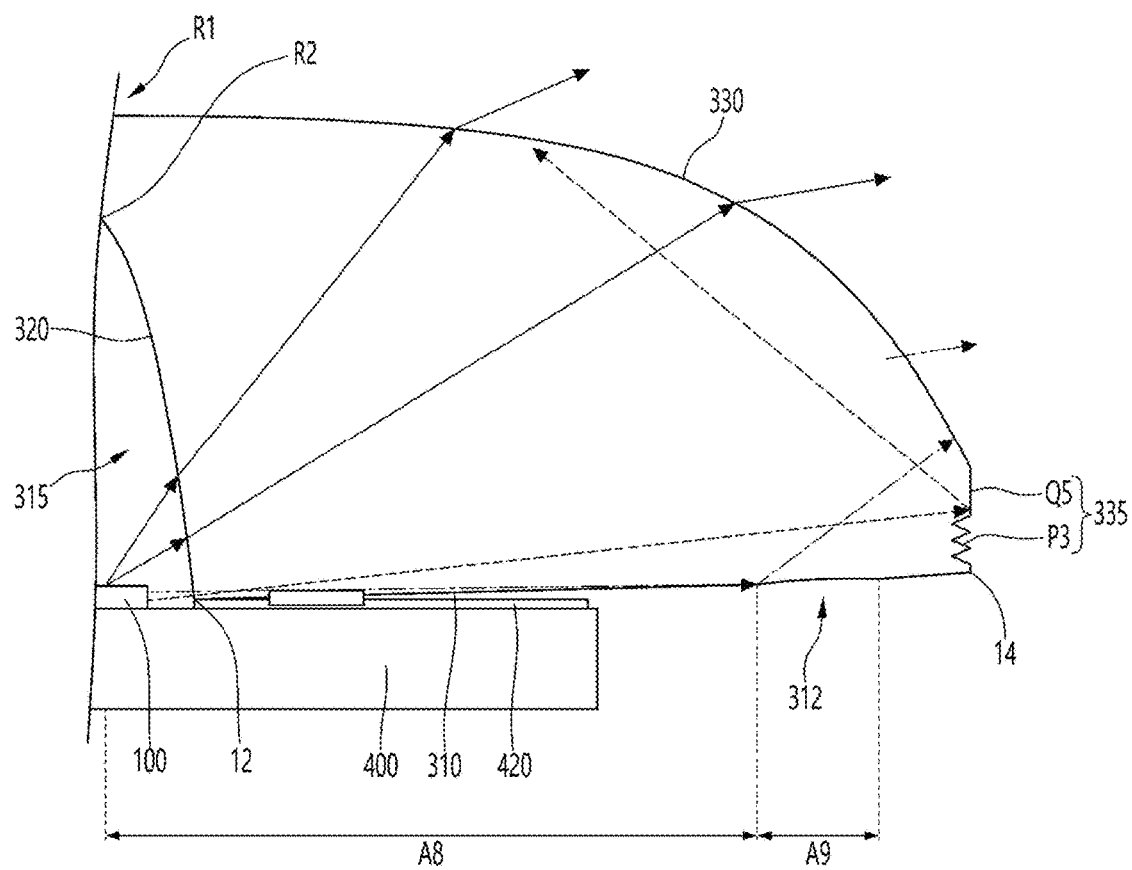
FIG. 12 is a view showing another example of a bottom surface of an optical lens according to an embodiment of the invention.
Figure 13:
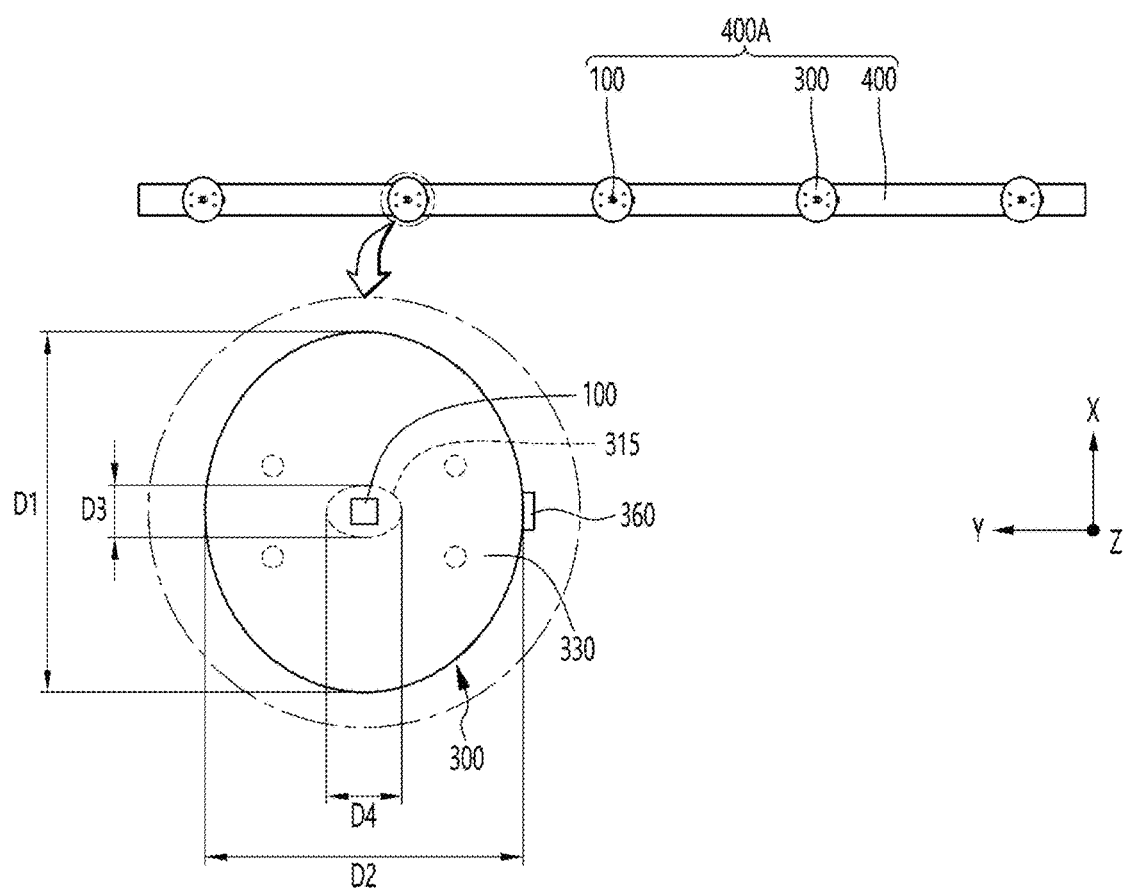
FIG. 13 is an example in which an optical lens according to an embodiment of the invention is arranged on a circuit board.

FIG. 1 is a perspective view of a light emitting module having an optical lens on a circuit board according to an embodiment of the invention, FIG. 2 is a plan view of the optical lens in FIG. 1, and FIG. 3 is a cross-sectional view of the optical lens of FIG. 4 is a partially enlarged view of the incident surface of the recess of FIG. 3, FIG. 5 is a cross-sectional view on the B-B side of the optical lens of FIG. 2, and FIGS. 6 and 7 are examples of bottom views of the optical lens of FIG. 2, and FIG. 8 is a cross-sectional view in which the optical lens of FIG. 3 is disposed on the circuit board, FIG. 9 is a cross-sectional view in which the optical lens of FIG. 5 is disposed on the circuit board, and FIGS. 10 and 11 are a side view showing another example of a flange portion of the optical lens according to an embodiment of the invention, FIG. 12 is a view showing another example of the bottom surface of an optical lens according to an embodiment of the invention, and FIG. 13 is an example in which an optical lens according to an embodiment of the invention is arranged on the circuit board.

In the description of the invention, a first axis Y direction may be a length direction of the circuit board 400 or a direction in which the optical lenses 300 are arranged on the circuit board 400. The second axis X direction may be a direction orthogonal to the first axis Y direction, and the third axis Z direction may be a direction orthogonal to the first and second axis Y and X directions.

Referring to FIGS. 1 to 9, a light emitting module may include a plurality of optical lenses 300 arranged on the circuit board 400. The circuit board 400 may have a long length in a first axis Y direction, and a length in the first axis Y direction may be disposed greater than a width W1 in the second axis X direction. In the optical lens 300, the length in the second axis X direction may be a second length D2, the length in the first axis Y direction may be the first length D1, and the first and second lengths may have a relationship of D2>D1.

The width W1 of the circuit board 400 in the second axis X direction may be smaller than the length D1 of the optical lens 300, and may be smaller than the second length D2 of the second axis X direction of the optical lens 300. By providing the width W1 of the circuit board 400 to be narrower than the lengths D1 and D2 of the optical lens 300, waste of material on the circuit board 400 may be prevented. Here, the relationship between the width W1 of the circuit board 400 and the first and second lengths D1 and D2 may have a relationship of D2>D1>W1.

A reflective layer 420 may be formed on the circuit board 400. The reflective layer 420 may be attached as a separate reflective sheet or may be coated with a reflective material such as a solder resist.

As shown in FIGS. 2 to 6, the optical lens 300 includes a bottom surface 310, a recess 315 concave in a center region of the bottom surface 310, and an incident surface 320 on a circumference of the recess 315. a light exit surface 330 from which light is emitted, and a flange portion 335 around an outer periphery of the light exit surface 330.

The lengths D1 and D2 of the optical lens 300 may be disposed greater than the thickness Z1 of the optical lens. The lengths D1 and D2 of the optical lens 300 may be 2.5 times or more, for example, 3 times or more of the thickness Z1. The second length D2 of the optical lens 300 may be 20 mm or more, for example, 20 mm to 30 mm or 22 mm to 28 mm, and the first length D1 may be smaller than the second length D2 and may be 18 mm or more, for example, in a range from 18 mm to 28 mm or from 22 mm to 26 mm. The first length D1 may be disposed smaller than the second length D2, the second length D2 may be greater than the first length D1 by 0.5 mm or more, for example, 1 mm or more or in a range of 2 mm to 4 mm. The thickness Z1 of the optical lens 300 may be 6.5 mm or more, for example, 6.5 mm to 9 mm or 6.7 mm to 8 mm. Since different lengths D1 and D2 of the optical lens 300 are disposed greater than the thickness Z1, a uniform luminance distribution may be provided over an entire region of the lighting device or the light unit. In addition, since the region covered within the light unit is improved, the number of the optical lenses may be reduced, and the thickness Z1 of the optical lens 300 may be reduced.

The optical lens 300 may define an axis direction perpendicular to a bottom center P0 of the recess 315 as a center axis Z0 or an optical axis. Two directions orthogonal to each other from the bottom center P0 of the recess 315 may be the first axis Y direction and the second axis X direction. The bottom center P0 of the recess 315 may be the lower center of the optical lens 300 and may be defined as a reference point.

The optical lens 300 may include a light-transmitting material. The optical lens 300 may include at least one of polycarbonate (PC), polymethyl methacrylate (PMMA), silicone or epoxy resin, or glass. The optical lens 300 may include a transparent material having a refractive index in the range of 1.4 to 1.7.

The bottom surface 310 of the optical lens 300 according to an embodiment of the invention may be disposed between the recess 315 and the flange portion 335. The bottom surface 310 may include a surface inclined in the horizontal first axis Y and second axis X directions, may include a curved surface, or may include both an inclined surface and a curved surface. The bottom surface 310 includes a surface inclined from the first edge 11 and 12 adjacent to the lower end of the recess 315 or around the lower end of the recess 315 to the flange portion 335 or the second edge 13 and 14 adjacent to the flange portion 335. Here, a straight line passing from the first edge 11 and 12 to the second edge 13 and 14 may be inclined by 10 degrees or less with respect to a straight line passing through the first and second axes Y and X, for example, in the range of 1 to 10 degrees or 2 degrees to 5 degrees.

Here, a distance from the first edge 11 to the second edge 13 in the first axis Y direction may be greater than a distance from the first edge 2 to the second edge 14 in the second axis X direction.

The first edge 11 and 12 is a boundary region between the incident surface 320 and the bottom surface 310 and may be the lower point region of the optical lens 300, that is, the lowest point in a region of the bottom surface 310. A position of the first edges 11 and 12 may be positioned lower than positions of the second edges 13 and 14 with respect to the horizontal second axis X. The first edges 11 and 12 may cover the lower circumference of the incident surface 320. The second edges 13 and 14 may be an outer region of the bottom surface 310 or a lower region of the flange portion 335. The second edges 13 and 14 may be a boundary region between the bottom surface 310 and the flange portion 335.

In the bottom surface 310, an interval between the bottom surface 310 and the straight lines passing through the first edges 11 and 12 in the first and second axes Y and X may gradually decrease as a region of the bottom surface 310 is adjacent to the first edges 11 and 12. The interval between the bottom surface 310 and the straight lines passing through the first edges 11 and 12 in the first and second axis Y (or Y1) and X directions may gradually increase as a region of the bottom surface 310 is farther from the first edges 11 and 12. An interval between a straight line passing through the first edges 11 and 12 in the first and second axes Y (or Y1) and X and the second edges 13 and 14 may be a maximum, and an interval between a straight line passing through the first edges 11 and 12 in the first and second axes Y (or Y1) and X and the first edges 11 and 12 may be a minimum. The optical lens 300 may increase an amount of light incident on the bottom surface 310 through the incidence surface 320 and improve the directivity distribution of light.

Since the bottom surface 310 is lowered as the bottom surface 310 is adjacent to the first edges 11 and 12 at the lower end of the recess 315, an area of the bottom surface 310 may be further increased. The area of the incident surface 320 of the recess 315 may be wider as the bottom surface 310 is lowered. Since the depth Z2 of the recess 315 becomes the height from the first edges 11 and 12, the depth Z2 of the recess 315 may be deeper. As the area of the bottom surface 310 increases, the reflection area may be increased. Since the lower end of the recess 315 is lowered, the incident area may be increased.

The interval between the second edges 13 and 14 and the straight lines passing through the first edges 11 and 12 in the second axis X or the first axis Y may be 500 μm or less, for example, 450 μm or less. The interval between the second edges 13 and 14 and the straight lines passing through the first edges 11 and 12 in the second axis X or the first axis Y may be in the range of 200 μm to 450 μm, and when the interval is smaller than the range, a lower point position of the flange portion 335 may be lowered to cause an interference problem of the lights emitted to the flange portion 335, and when it is greater than the above range, there is a problem that the high point position of the flange portion 335 is increased, the curvature of the light exit surface 330 may be changed and the thickness Z1 of the optical lens 300 increases.

The bottom surface 310 may be formed as a curved surface having a Bezier curve. The curve of the bottom surface 310 may be implemented as a spline, for example, a cubic, B-spline, or T-spline. The curve of the bottom surface 310 may be implemented as a Bezier curve.

As shown in FIG. 6, the outer diameter of the bottom surface 310 may satisfy a condition the first length D1<the second length D2 in the direction of the first and second axes Y and X passing through the bottom center P0 of the recess 315. In the optical lens 300 according to the embodiment, since the second length D2 is disposed longer than the first length D1, the luminance distribution in the direction of the second axis X may not be reduced.

The entire region of the bottom surface 310 may include a corrosion-treated surface. The corrosion-treated region is a surface having a surface roughness, and may diffuse or scatter incident light and refract it in another direction. The corrosion-treated surface may be formed by corrosion treatment, and may be formed by chemical corrosion on the mold core during injection molding of the lens, or by polishing using a polishing equipment. Light incident on the bottom surface 310 by the corrosion-treated surface is scattered and reflected, thereby improving luminance uniformity.

As shown in FIGS. 3, 5, and 6, an outside in the bottom surface 310 may include one or a plurality of first reflective patterns P2. The first reflective pattern P2 may be disposed in a range of 60% or more, for example, in a range of 60% to 85%, or 60% to 80% in a lens radial direction from the center P0 of the bottom surface 310. The first reflective pattern P2 reflects incident light through a different path, thereby effectively diffusing light traveling to the bottom surface 310. As shown in FIG. 8, the first reflective pattern P2 may reflect light L2 emitted from the lower side of the light emitting device 100 toward the light exit surface 330, and the reflected light toward the light exit surface 330 may be reflected or refracted around the center portion R1 to be transmitted. Accordingly, light incident to the periphery of the center portion R1 may suppress a Mura effects or a black pattern around the center portion R1.

As shown in FIG. 6, a convex portions P1 may be disposed on opposite sides along the upper circumference of the incident surface 320 or a convex portion P1 may be continuously formed in an elliptical shape along the upper circumference of the incident surface 320. The convex portions P1 is opposed to each other at both sides in the first axis Y direction, the maximum distance between the convex portions P1 may be a distance in the first axis Y direction, and the minimum distance between the convex portions P1 may be a distance in the second axis X direction. As shown in FIG. 4, the convex portion P1 may have one or more convex curved surfaces and concave curved surfaces connected thereto. The convex portion P1 may include one or more convex curved surfaces, one or more concave curved surfaces, or a structure in which a convex curved surface and a concave curved surface are repeated in at least two cycles.

The first reflective pattern P2 disposed on the bottom surface 310 may be formed in a curved shape in which a groove is less than or equal to a half circle or in a range of ½ to ¼ of a circle. The first reflective pattern P2 may be disposed on an outer circumference of a first support protrusion 351 and an outer circumference of a second support protrusion 353, respectively. A plurality of the first reflective patterns P2 may extend with a curve in the long axis (e.g. X axis) direction based on the short axis (e.g. Y axis) direction, and may be separated from each other by 60% or more of the first length D1, for example, 11 mm or more of the first length D1.

The maximum linear distance DP2 of each of the first reflective patterns P2 is a linear distance between both ends thereof and may be 15 mm or more, for example, in a range of 15 mm to 20 mm or 16 mm to 19 mm. Each of the first reflective patterns P2 may have a line width of the end EP2 extending to a width smaller than an inner width, and may be 0.5 mm or more, for example, in a range of 0.5 mm to 1.5 mm.

The maximum distance between the first reflective patterns P2 in the first axis Y direction may be 80% or more of the first length D1, for example, 70% to 90% or 80% to 90%. have. The minimum distance between the first reflective patterns P2 in the first axis Y direction may be 55% or less, for example, in the range of 40% to 50%. Accordingly, two first reflective patterns P2 spaced at least 50% apart in the first axis Y direction and may reflect light traveling in the first axis Y direction toward the light exit surface 330 or/and the center portion R1.

A plurality of the first reflective patterns P2 may be disposed outside the support protrusions 351 and 353 as grooves having the same radius with respect to the bottom center P0, or may have grooves having different radii. The first reflective pattern P2 may be formed as a discontinuous groove pattern. In the first reflective pattern P2, grooves having a minimum radius A7 may be formed in a discontinuous curve.

The maximum distance DP2 of the first reflective pattern P2 is formed in a range of 80% to 120% of the width W1 of the circuit board 400, and as shown in FIGS. 8 and 9, an end of the first reflective pattern P2 may be partially exposed to an outside of the circuit board 400. Accordingly, the first reflective pattern P2 disposed on the outside of the circuit board 400 may reflect or reflect light traveling in the length direction Y of the circuit board 400 through the first reflective pattern P2. By changing the path of the light, it is possible to prevent interference or re-incidence to other lenses.

As shown in FIG. 7, as another example, a convex portion P1 may have a bottom view shape formed in an elliptical shape along the upper circumference of the incident surface 320. That is, the maximum diameter of the convex portion P1 may be a distance in the first axis Y direction, and the minimum diameter may be a distance in the second axis X direction. As shown in FIG. 4, the convex portion P1 may have one or two or more convex curved surfaces and concave curved surfaces connected thereto.

The first reflective pattern P2 may formed in grooves having a minimum radius A7 and having a continuous circular shape. The diameter of the first reflective pattern P2 in the direction of the first axis Y and the second axis X may be 80% or more of the first length D1, for example, in the range of 70% to 90% or 80% to 90% of the first length D1. The first reflective pattern P2 may have a circular shape. The circular grooves in the first reflective pattern P2 have a diameter greater than the width W1 of the circuit board 400, and may be partially exposed to an outer side of the circuit board 400 as shown in FIGS. 8 and 9. Accordingly, the first reflective pattern P2 disposed to the outer side of the circuit board 400 may induce the light travelling to the outside of the circuit board 400 through the first reflection pattern P2 or reflected light by the first reflective pattern P2 to total internal reflection and prevents the problem that light interferes or re-incidents to other lenses. The first reflective pattern P2 disposed to the outer side of the circuit board 400 changes the path of light that proceeds to the circuit board 400 through the first reflective pattern P2 and may blocks the re-incidence of light.

The bottom surface 310 may include a first rough region Q1 disposed around the recess 315 and second and third rough regions Q2 and Q3 disposed between the first rough region Q1 and the flange portion 335. The first to third rough regions Q1, Q2, and Q3 may be formed as uneven surfaces, and a size of the surface roughness Ra may be smaller than a groove depth of the first reflective pattern P2.

The first rough region Q1 of the bottom surface 310 is disposed in a region within the first distance A5 and A6 from the bottom center P0, satisfies the condition of distance A5>A6, and may be disposed on a region of 30% or less of a bottom radius. The bottom radius may be ½ of the first length D1 and ½ of the second length D2. An outline of the first rough region Q1 may have an elliptical shape. The shape of the bottom of the recess 115 may have the same elliptical shape as the outline shape of the first rough region Q1.

The second rough region Q2 of the bottom surface 310 is disposed between the first rough region Q1 and the first reflective pattern P2, and the third rough region Q3 is disposed between the first reflective pattern P2 and the flange portion 335.

Figure 15:
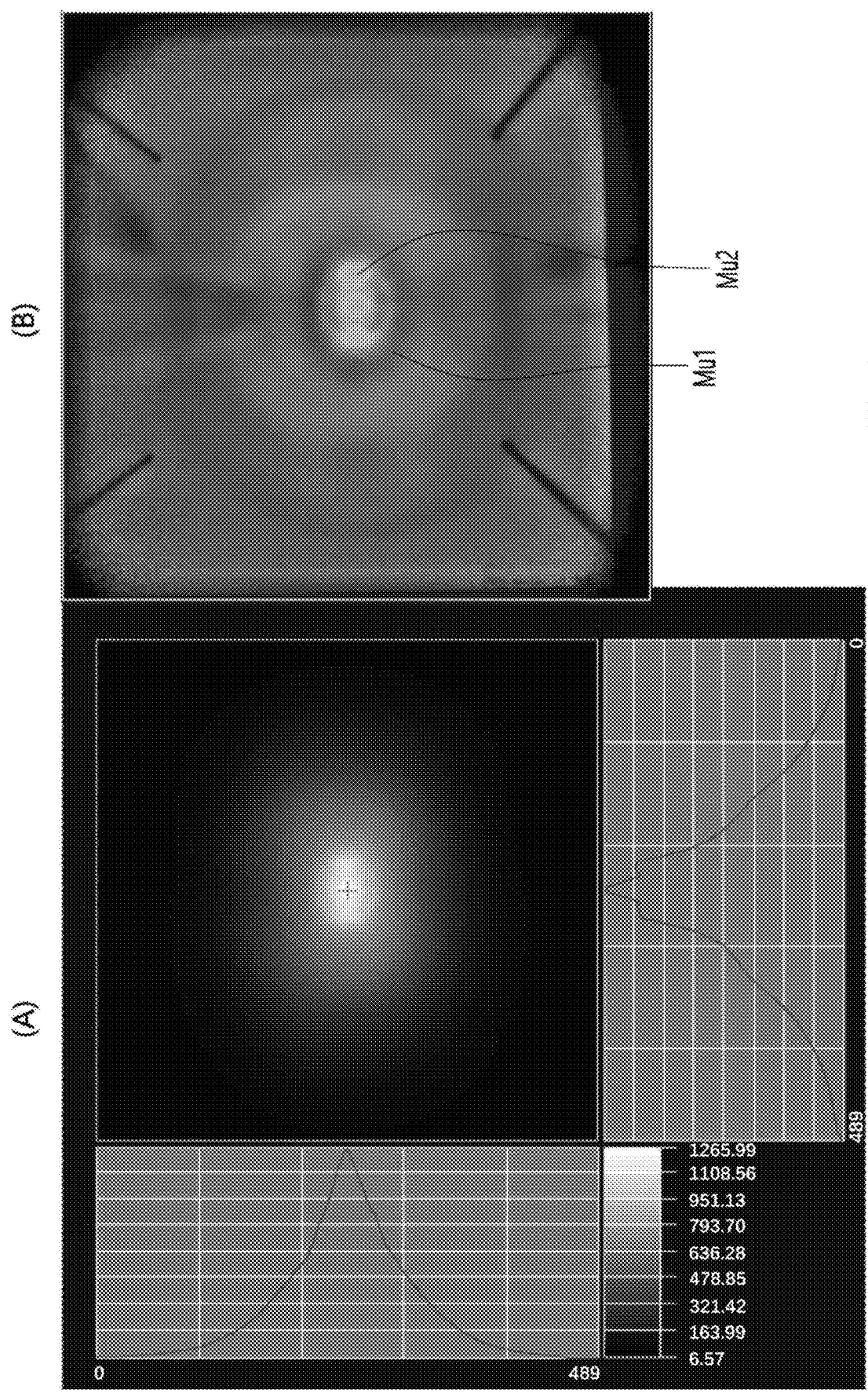
FIG. 15 is a diagram showing a luminous intensity graph and a luminance distribution in each axis direction of an optical lens according to a comparative example.

The first to third rough regions Q1, Q2, and Q3 have different surface roughnesses, and have higher diffusivity than those having the same surface roughness in all regions, and may be prevented from forming a circular band-shaped Mura pattern (Mu1 in FIG. 15). Accordingly, it is possible to improve the problem of condensing light around the recess 315.

A surface roughness Ra value of the first rough region Q1 may be lower than a surface roughness value of the second and third rough regions Q2 and Q3. Accordingly, since the surface roughness of the first rough region Q1 adjacent to the recess 315 among the bottom surface 310 is provided lower than that of the second and third rough regions Q2 and Q3 outside the recess 315, the reflection efficiency of the first rough region Q1 around the recess 315 may be reduced, a hot spot problem may be eliminated, and uniformity of a luminance distribution may be improved. The surface roughness of the second and third rough regions Q2 and Q3 may be higher than the surface roughness of the first rough region Q1, thereby increasing the reflection efficiency of light in the outer bottom region, thereby improving the overall luminance distribution. The surface roughness Ra of the first rough region Q1 may be 0.6 µm or less, for example, in a range of 0.4 to 0.5 The second and third rough regions Q2 and Q3 may have the same surface roughness from each other, or the third rough region Q3 outside the second rough region Q2 may have a higher surface roughness than the surface roughness of the second rough region Q2. The surface roughness of the second and third rough regions Q2 and Q3 may be 2 times or more, for example, 3 times or more, higher than the surface roughness of the first rough region Q1, and may be 1.3 µm or more, for example, in a range of 1.3 µm to 1.8 µm or 1.4 µm to 1.7 µm.

The distance from an upper surface of the circuit board 410 to the bottom surface 310 of the optical lens may gradually increase from the first edges 11 and 12 to the second edges 13 and 14. The distance from the upper surface of the circuit board 410 to the bottom surface 310 may gradually increase from the first rough region Q1 to the third rough region Q3.

A plurality of support protrusions 351 and 353 may be disposed on the bottom surface 310. The support protrusions 351 and 353 may include first support protrusions 351 and second support protrusions 353 disposed on both sides of the recess 315 in the second axis X direction. Each of the first and second support protrusions 351 and 353 are disposed in plurality, the plurality of first support protrusions 351 may space apart in the second axis X direction, and the plurality of second support protrusions 353 may space apart in the second axis X direction. A separation distance between the first support protrusions 351 may be greater than the length D3 of the recess 315, and a separation distance between the second support protrusions 353 may be greater than the length D3 of the recess 315. Accordingly, it is possible to stably support the optical lens 300 on the circuit board 400.

The first and second support protrusions 351 and 353 may be disposed inside the first reflective pattern P2, and may be closer the first reflective pattern P2 than the first rough region Q1 or the recess 315. The distance in the first axis Y direction between the first and second support protrusions 351 and 353 may be smaller than the diameter of the first reflective pattern P2, for example, 80% or more of the diameter of the first reflective pattern P2, for example, in a range of 80% to 99%. Here, in FIGS. 5 and 9, the first reflective pattern P2 of the optical lens 300 may be described based on FIG. 7, and in the structure of FIG. 6, when viewed based on the second axis X in FIGS. 5 and 9, the first reflective pattern P2 may not be exposed.

As shown in FIGS. 1, 8, and 9, the first and second support protrusions 351 and 353 may be adhered to the circuit board 400 with an adhesive, and each of the first and second support protrusions 351 and 353 may be inserted to be adhered through a hole of the reflective layer 420 on the circuit board 400. FIGS. 8 and 9 illustrate examples in which the support protrusions 351 and 353 are coupled to the hole of the reflective layer 420 for convenience of description. The shapes of straight lines passing through the first and second support protrusions 351 and 353 may have a rectangular shape. As another example, one of the groups of the first and second support protrusions 351 and 353 may be larger or smaller than the number of other groups, and may have a triangular or pentagonal shape.

The first and second support protrusions 351 and 353 may be disposed at the same distance from the bottom center P0. As another example, at least one of the first and second support protrusions 351 and 353 may have a different distance based on the center of the floor P0. The distance between the first support protrusions 351 may be the same as the distance between the second support protrusions 353. Each of the first and second support protrusions 351 and 353 may be formed in a column shape having a narrow lower portion and a wide upper portion such that a coupling area of one of the first and second support protrusions 351 and 353 increases.

As shown in FIGS. 3 to 6, the recess 315 has a shape that is concave in a direction of the light exit surface 330 from the center region of the bottom surface 310. The recess 315 has an oval shape in a bottom shape. The bottom view shape of the bottom surface 310 may include an ellipse shape.

The recess 315 may have a bell shape, a shell shape, or an ellipse shape in a side cross section. The recess 315 may have a shape whose width gradually decreases as it goes upward. The recess 315 may have a shape that gradually converges from the first edges 11 and 12 around the bottom toward a first vertex R2 at the top. When the bottom view of the recess 315 has an elliptical shape, the recess 315 may include a lower region gradually decreasing in diameter toward the first vertex R2, a middle region whose the diameter decreases and an upper region whose the diameter is again decreased. The recess 315 may be provided in an axially symmetrical shape with respect to the center axis Z0. The center portion R1 of the incident surface 320 may be provided as a concave curved surface having a radius of curvature smaller than that of an outer second regions A3 and A4.

The bottom widths D3 and D4 of the recess 315 may have a width into which a light source, that is, a light emitting device may be inserted, which will be described later. The bottom widths D3 and D4 of the recess 315 may be 3 times or less, for example, 2.5 times or less of the width of the light emitting device 100. The bottom widths D3 and D4 of the recess 315 may be in the range of 1.2 to 2.5 times the width of the light emitting device 100, and when it is smaller than the above range, insertion of the light emitting device 100 is not easy. When it is greater than the above range, light loss or light interference may be caused through the region between the light emitting device and the first edges 11 and 12.

Explaining at the bottom width of the recess 315, the width D4 in the second axis X direction may be different from the width D3 in the first axis Y direction. For example, the width D4 in the second axis X direction passing through the bottom center P0 of the recess 315 may be smaller than the width D3 in the second axis direction passing through the bottom center P0 of the recess 315. The bottom width of the recess 315 satisfies the condition of D4<D3, and a difference between the bottom widths D3 and D4 may have a difference of 0.5 mm or more and 4 mm or less, for example, in a range of 1 mm or more and 2 mm or less. The width D3 may be 4 times or less, for example, 2 times or less of D4. The ratio (D4:D3) of the bottom widths D3 and D4 of the recess 315 may have a difference in the range of 1:1.3 to 1:2. When the width D3 in the first axis Y direction is smaller than the width D4 in the second axis (X) direction, the luminance improvement in the Y-axis direction is insignificant, and when it is greater than the above range, the luminance distribution of the X-axis direction may be relatively small.

In the optical lens 300 according to the embodiment of the invention, the second length D2 in the second axis X direction is greater than the first length D1 in the first axis Y direction, and the width D4 of the recess 315 in the second axis X direction may be smaller than the width D3 in the first axis Y direction. Accordingly, the optical lens 300 may secure a luminance distribution in the first axis Y direction due to an external length difference, and in terms of luminance distribution, the incident light may be widely diffused in the direction of the second axis X and in the corner region by the recess 315.

The number of bars of the light emitting module in which the optical lens 300 is arranged may be reduced to two or less, for example, one, and luminance distribution of upper/lower corners of the backlight unit may be improved.

The incident surface 320 has a curved surface that is convex upward from the center region of the bottom surface 310, and may be a circumferential surface or an inner surface of the recess 315. The incident surface 320 may gradually increase as the distance to the bottom center P0 of the recess 315 increases upward. Since the incident surface 320 is provided as a convex curved surface, light may be refracted in entire regions. The lower region of the incidence surface 320 is disposed at a position lower than the flange portion 335 to receive light directly or indirectly. The lower region of the incident surface 320 may receive light reflected from the bottom of the recess 315. The incident surface 320 may be formed as a rotating body having a Bezier curve. The curve of the incident surface 320 may be implemented as a spline, for example, a cubic, B-spline, or T-spline. The curve of the incident surface 320 may be implemented as a Bezier curve.

The light exit surface 330 may be a surface opposite to the incident surface 320 and the bottom surface 310 with respect to the lens body. The light exit surface 330 may have a convex curved surface outside of the center portion R1 and may include a concave curved surface toward the center portion R1. A point of the light exit surface 330 corresponding to the center axis Z0 may be the center portion R1, and the center portion R1 may be the center of the light exit surface of the lens body. The light exit surface 330 may have a concave center portion R1, and may have a convex curved surface toward the outside. The entire region of the light exit surface 330 may be curved, for example, the center portion R1 may have a negative curvature and an outer side may have a different positive curvature. The light exit surface 330 may have an axisymmetric shape with respect to the center axis Z0, for example, a second axis X or a first axis Y symmetrical shape. A center-side first region A1 and A2 adjacent to the center portion R1 based on the flange portion 335 have negative curvature, and the outer side regions of the first regions A1 and A2 may have different positive curvatures. The second regions A3 and A4, which are the outer side regions of the first regions A1 and A2, may be formed as curved surfaces having different curvature radii.

A distance between the light exit surface 330 and the bottom center P0 of the recess 315 may gradually increase as the distance from the center axis Z0 increases. The first regions A1 and A2 of the light exit surface 330 are center portion R1 having a concave curved surface, and may include a region vertically overlapping with the recess 315. The second regions A3 and A4 of the light exit surface 330 may have a sharper curved surface than the first regions A1 and A2. Since the light exit surface 330 and the incident surface 320 have curved surfaces, the light emitted from the bottom center P0 of the recess 315 may be diffused in a lateral direction. The angle at which the light is refracted may increase as the light exit surface 330 and the incident surface 320 are further away from the center axis Z0 in an angle range within 70±4 from the center axis Z0.

The radius of curvature of the first regions A1 and A2 of the light exit surface 330 may be greater than the radius of curvature of the incident surface 320 when expressed as an absolute value. The radius of curvature of the first regions A1 and A2 of the light exit surface 330 may be greater than the radius of curvature of the second regions A3 and A4 when expressed as an absolute value. The first regions A1 and A2 in the second axis X direction and the first axis Y direction may have the same or different curvature radii. The second regions A3 and A4 in the second axis X direction and the first axis Y direction may have the same or different curvature radii.

In the boundary region between the light exit surface 330 and the flange portion 335, the angle at which the light is refracted may be reduced, for example, may be reduced to an angle range of 2 degrees or less. This is because a surface of the light exit surface 330 that is close to the flange portion 335 may be provided as a surface that is close to a tangent line or a vertical surface, so that the angle at which the light is refracted may be gradually decreased.

The flange portion 335 may be disposed at a position higher than the horizontal second axis X and the first axis Y on the bottom of the recess 315. The flange portion 335 may be a flat surface or an inclined surface, and may be defined as an outer exit surface. The flange portion 335 may extend vertically or obliquely from an outer line of the light exit surface 330. The flange portion 335 may be located at the same position as the outer line of the light exit surface 330 or may be located at inner side or outer side than the outer line of the light exit surface 330.

As shown in FIGS. 1 to 3, the flange portion 335 may include at least one side protrusion 360 protruding outward. The side protrusion 360 may be disposed on a surface of the flange portion 335 in the first axis Y direction. As shown in FIG. 12, the side protrusion 360 may protrude in a direction in which the optical lenses of the circuit board 400 are arranged. The side protrusion 360 may protrude outward from a region closer to an upper end than a lower end of the flange portion 335 and may be a gate region.

Here, the relationship between the recess 315, the light exit surface 330, and the flange portion 335 will be described as follows.

Referring to FIGS. 3 to 5, the depth Z2 of the recess 315 has a distance from the bottom center P0 to the first vertex R2. Here, the first vertex R2 may be a vertex of the incident surface 320 or an upper point of the recess 315. The depth Z2 of the recess 315 may be 5 mm or more, for example, 6 mm or more, or in a range of 6 mm to 7 mm. The depth Z2 has a depth of 75% or more, for example, 80% or more of the thickness Z1 of the optical lens 300. The depth Z2 of the recess 315 may be 80% or more of a distance between the center portion R1 of the light exit surface 330 and the bottom center P0 or the first edge 23. Since the depth Z2 of the recess 315 is disposed deeply and the center portion R1 of the light exit surface 330 is disposed in a concave curved surface, a periphery region of the first vertex R2 of the incident surface 320 may be diffused the incident light in a lateral direction, and the center portion R1 may refract the incident light in the lateral direction. Since the depth Z2 of the recess 315 is disposed relatively deep, the light incident on the incident surface 320 through the peripheral region of the first vertex R2 in a region close to the center portion R1 may be refracted in a side direction, and the convex portion P1 may reflect incident light in the opposite direction.

The minimum distance Z3 between the recess 315 and the light exit surface 330 may be a distance between the first vertex R2 of the incident surface 320 and the center portion R1 of the light exit surface 330. The distance Z3 may be 2.5 mm or less, for example, in a range of 0.6 mm to 2.5 mm or 0.8 mm to 1.5 mm. When the distance Z3 between the first vertex R2 of the incident surface 320 and the center portion R1 of the light exit surface 330 is greater than 2.5 mm, a difference in the amount of light traveling to the first regions A1 and A2 ad the second regions A3 and A4 of the light exit surface 330 may increase, and the light distribution may not be uniform. When the distance Z3 between the first vertex R2 of the incident surface 320 and the center portion R1 of the light exit surface 330 is less than 0.6 mm, a stiffness of the center side of the optical lens 300 is weakened. By arranging the distance Z3 between the recess 315 and the light exit surface 330 in the above range, the first regions A1 and A2 or the center portion R1 of the light exit surface 330 may have a total reflective surface or a negative curvature, and more light by the first regions A1 and A2 or the center portion R1 may be diffused in a lateral direction from the center axis, and light may be diffused in the second axis X direction by the convex portion P1. That is, as the first vertex R2 of the incident surface 320 is adjacent to the concave center portion R1 of the light exit surface 330, the amount of light may be increased for the light traveling in a lateral direction of the light exit surface 330 through the incident surface 320 having the convex portion P1. Accordingly, it is possible to increase the amount of light diffused from the optical axis or the center of the optical lens 300 in the second axis X direction.

The first vertex R2 of the incident surface 320 may be disposed closer to the center portion R1, which is the center of the light exit surface 330, rather than a straight line extending horizontally from the upper end 35 of the flange portion 335.

The width Z7 of the flange portion 335 is a linear distance between the second edge 25 and a third edge 35 and may be smaller than the depth Z2 of the recess 315. The width Z7 of the flange portion 335 may be 2 mm or more, for example, in a range of 2 mm to 2.6 mm or 2.2 mm to 2.6 mm. When the width Z7 of the flange portion 335 exceeds the above range, the amount of light emitted to the flange portion 335 increases, making it difficult to control the light distribution, and when the width Z7 of the flange portion 335 is smaller than the above range, when manufacturing a lens body, it may be difficult to secure a gate region.

As shown in FIGS. 3 and 5, the flange portion 335 may include an outer rough region Q5 around the entire surface or an upper circumference. A second reflective pattern P3 is included in a lower circumference of the outer rough region Q5 or a lower circumference of the flange portion 335. The second reflective pattern P3 may have a plurality of grooves having a curved shape and may be disposed in plurality from the upper circumference toward the bottom second edges 13 and 14. The surface roughness Ra of the outer rough region Q5 may be 0.45 µm or more, for example, in a range of 0.45 µm to 0.6 µm. The surface roughness Ra of the outer rough region Q5 may be higher than that of the first rough region Q1 of the bottom surface 310. Accordingly, the outer rough region Q5 may effectively reflect or/and diffuse incident light.

The second reflective pattern P3 may be disposed at the lower circumference than a center of the flange portion 335. The second reflective pattern P3 is disposed in a range of 45% or less of the width Z7 of the flange portion 335, for example, in a range of 30% to 45%, or in a range of 30% to 42% of the width Z7 of the flange portion 335. The second reflective pattern P3 may reflect light emitted from the side or upper side of the light emitting device 100 by inducing, for example, a reflection or total internal reflection. The side cross-section of the second reflective pattern P3 may be a triangular shape or a rectangular or hemispherical groove.

As shown in FIGS. 3 and 4, the incident surface 320 may include the convex portion P1 whose the upper circumference protrudes in the direction of the center axis Z0. The convex portion P1 may protrude in the optical axis direction or a center direction rather than a curve of the curved incident surface 320, and the center of the convex portion P1 may be disposed at a predetermined height Z5 from the bottom center P0. The convex portion P1 may be closer to the first vertex R2 than the first edges 11 and 12. The convex portion P1 may have an inflection point on a curved surface of the incidence surface 320, and for example, an inflection point may be formed at a lower end and an upper end of the convex portion P1, respectively. At least one convex curved surface and at least one concave curved surface may be connected to the convex portion P1. The convex portion P1 may have a concave curved surface and a convex curved surface repeatedly extending from a lower portion of the incident surface 320 to an upper direction. Accordingly, in the convex portion P1, since the concave curved surface and the convex curved surface are connected with an inflection point, incident light may be refracted or reflected.

The center position Z5 of the convex portion P1 may be disposed in a range of 3 mm to 4.8 mm or 3 mm to 4.6 mm from the bottom center P0, and the width PZ1 of the convex portion P1 is 0.8 mm or less, for example, may be in the range of 0.4 mm to 0.8 mm or 0.4 mm to 0.6 mm. As shown in FIG. 8, when the convex portion P1 is emitted to the upper surface of the light emitting device 100 and then the light L1 is incident through the incident surface 320, the light after refraction does not proceed in the direction away from the center axis Z0 (dotted line) and may be refracted in a direction close to the center axis Z0, thereby suppressing the formation of a ring-shaped Mura or black pattern around the center portion R1.

The height Z5 of the convex portion P1 is disposed at a position of 60% or more of the depth Z2 of the recess 315 based on the bottom center P0, for example, in the range of 60% to 73% or 65% to 73% of the depth Z2 of the recess 315. As shown in FIG. 6, the convex portion P1 is disposed along the circumference of the incident surface 320 and may be disposed on both sides in the second axis X direction. A plurality of the convex portions P1 may be spaced apart from a straight line passing through the first axis Y direction based on the optical axis Z0. That is, the convex portions P1 are respectively disposed on the surface of the incident surface 320 in the short axis direction of the recess 315 and may be spaced apart from the incident surface 320 in the long axis direction of the recess 315. Since the convex portion P1 protrudes from the incident surface 320 in the short axis direction based on the optical axis direction, the incident light may reflect in the opposite side directions from each other, that is, in the second axis X direction. Hot spots may be prevented, and light diffusion may be guided in the long axis (e.g., X) direction of the optical lens 300.

As shown in FIG. 11, the flange portion 335 may reflect or refract light reflected through the bottom surface 310. The light reflected by the flange portion 335 may proceed to the light exit surface 330 and be refracted by the light exit surface 330 and then emitted. The light refracted by the flange portion 335 may proceed to the light exit surface 330. In addition, the light refracted by the flange portion 335 is radiated or reflected at an angle smaller than an angle before refraction with respect to the center axis Z0. Accordingly, the flange portion 335 may prevent the refracted light from radiating in a direction lower than the horizontal axis or in a direction of the horizontal axis, and may prevent interference or loss of light to adjacent optical members. Since the flange portion 335 refracts light that deviates from the center axis Z0 with respect to the bottom center P0 of the recess 315, light loss may be reduced.

As shown in FIGS. 5 and 6, the first regions A1 and A2 of the light exit surface 330 are concave regions vertically overlapping with the recess 315, and the bottom center P0 may be located at an angle of 30 degrees or less from the center axis Z0, for example, in a range of 14 to 30 degrees from the center axis Z0. By the concave first regions A1 and A2, the hot spot on the center portion R1 may be reduced, and a shape of a Mura effects or black pattern around the center portion R1 may be suppressed. When the first regions A1 and A2 of the light exit surface 330 exceed the above angular range, the radius or depth within the recess 315 becomes larger, and there is a problem that a difference in the amount of light between the first regions A1 and A2 and the second regions A3 and A4 is increased, and thus, there is problem that the Mura effects or a black pattern occurs.

In addition, the convex portion P1 is 30 degrees or less based on the optical axis Z0 from the light emitting device 100, for example, 15 degrees to 26 degrees or 17 degrees to 25 degrees, and the center portion R1 It is possible to suppress the Mura effects black pattern in the surrounding area. That is, as in the comparative example of FIG. 15B, it can be seen that a plurality of circular band-shaped Mura (Mu2) form hot spots inside, and a Mura-shaped black pattern (Mu1) is formed outside. have.

The flange portion 335 may be disposed around the lower portion of the light exit surface 330, and the bottom surface 310 may be disposed inside the second edges 13 and 14 of the flange portion 335. The bottom surface 310 may protrude below a horizontal line of the second edge 25 of the flange portion 335.

As shown in FIG. 8, the flange portion 335 may reflect light L3 incident on the second reflective pattern P3 through the incident surface 320 to a peripheral area of the center portion R1. Accordingly, it is possible to suppress the Mura effects around the center portion R1.

As shown in FIGS. 10 and 11, a width Z8 of the flange portion 335 is a vertical width and may be the maximum width on the outer surface in the first axis Y direction and the second axis X direction, and the width Z8 may gradually decrease as the distance from the outer surface in the first axis Y and the second axis X direction increases along the outer surface. That is, the width Z8 of the flange portion 335 may gradually decrease from the outer surface in the second axis X direction to a position of the minimum width toward the first axis Y direction along the radial direction based on the optical axis Z0 and may gradually increase from a position of the minimum width to the position of the maximum width, which is the outer surface of the first axis Y direction. Since the flange portion 335 has the maximum width Z8 in the first and second axis Y and X directions, it is possible to control the efficiency of transmitted light or reflected light through the lateral direction of the optical lens. Since a width of diagonal direction between the first and second axis Y and X directions is narrowed, light loss in the diagonal direction may be reduced. The maximum width of the width Z8 of the flange portion 335 may be smaller than the depth Z2 of the recess 315. The width Z8 may be set to a maximum and a minimum within a range of, for example, in a range of 1.5 mm to 2.6 mm. When the width Z9 of the flange portion 335 exceeds the above range, the amount of light emitted or reflected through the flange portion 335 increases, making it difficult to control the light distribution.

Here, in the second reflective pattern P3, a gap between the grooves on a section of the maximum width Z8 may be large, and a gap between the grooves on a section of the minimum width may be narrowed. In addition, in the second reflective pattern P3, a height of the grooves gradually decreases as the second reflective pattern P3 increases along the outer circumferential surface from the outer surface of the first and second axis Y and X directions, or grooves having a gradually thin depth may be disposed.

Also, the width (vertical width) of the outer rough region Q5 excluding the second reflective pattern P3 may gradually decrease as the distance from the outer circumferential surfaces of the first and second axis Y and X directions increases.

As shown in FIG. 12, the bottom surface 310 of the optical lens 300 may include a reflective region A9 having a concave portion 312 around the inner region A8. The concave portion 312 may be formed in the reflective region A9 formed in a circular shape along the circumference of the inner region A8, and may be a region in which the first reflective pattern P2 disclosed above is formed, or a region disposed inside the first reflective pattern P2. The concave portion 312 may be a region disposed between the first reflective pattern P2 and the support protrusions 351 and 353. The inner region A8 may include the corroded first and second rough regions Q1 and Q2 disclosed above. Although the first reflective pattern P2 is not illustrated in FIG. 11, based on the description disclosed above, both the first reflective pattern P2 and the concave portion 312 may be included.

Since the concave portion 312 is formed in a concave curved surface on a straight line passing through the first edges 11 and 12 and the second edges 13 and 14 of the bottom surface 312, the emitted light in the lateral direction of the light emitting device 100 may be directly reflected and it is possible to prevent a problem in which light is directly transmitted through the flange portion 335.

As shown in FIG. 13, the optical lens 300 according to an embodiment of the invention may be arranged on the circuit board 400 with a predetermined distance in the first axis Y direction. Since the optical lens 300 has a condition (D4>D3) of the widths of the recess 315 and satisfies the condition (D1>D2) of the lengths of the light exit surface 330, the number of optical lens 300 may be reduced while increasing the interval between the optical lenses 300, and the distribution of light diffused in the second axis X direction may be improved by an anisotropic shape or an asymmetric shape of the recess 315.

In the light emitting module 400A, a plurality of optical lenses 300 may be arranged on one or a plurality of circuit boards 400, and the light emitting devices 100 may be provided in the recesses 315 of each optical lens 300. One or a plurality of light emitting modules 400A may be disposed in a light unit or a cover of a lighting device.

The light emitting device 100 may include a light emitting structure having a group II to VI compound semiconductor under a light-transmitting substrate, and may be mounted on the circuit board 400 as a flip chip. The light emitting device 100 may emit light through an upper surface and a plurality of side surfaces. As another example, the light emitting device 100 may be disposed as a horizontal chip or a vertical chip, or may be provided as a packaged package. The light emitting device 100 may include a phosphor layer to which a phosphor is added on a surface or a light path. The light emitting device 100 may emit at least one or two or more of red, green, blue, and white.

An optical sheet (not shown) may be disposed on the light emitting module 400A, and the optical sheet may include at least one of a prism sheet collecting scattered light, a luminance enhancing sheet, and a diffusion sheet for diffusing light again. A light guide layer (not shown) made of a transparent material may be disposed in a region between the optical sheet and the light emitting module, but the embodiment is not limited thereto.

The light emitting module according to the embodiment of the invention may be applied to a light unit. The light unit includes a structure having one or a plurality of light emitting modules, and may include a three-dimensional display, various lighting lights, traffic lights, vehicle headlamps, and electronic signs.

FIGS. 14A and 14B are diagrams showing luminous intensity and luminance distribution in each axis direction in an optical lens according to an embodiment of the invention, and FIGS. 15A and 15B are a diagram showing the luminous intensity and luminance distribution in the direction of each axis of an optical lens of a comparative example. Here, an optical lens of the comparative example does not have the rough regions Q1, Q2, and Q3 on the bottom surface 310, the center portion R1, the first reflective pattern P2, and the convex portions P1 of the incident surface 320 disclosed in the optical lens of the invention.

As shown in FIGS. 14A and 15A, looking at the luminous intensity in the second axis X direction of the optical lens, that is, in the long axis direction, it may be seen that FIG. 14A is more uniform in the center portion. Here, in FIGS. 14A and 15A, a unit of the horizontal axis is mm, and a unit of the vertical axis is luminous intensity (lux). When comparing of FIG. 14B and FIG. 15B, FIG. 15B has a problem that Mura patterns (Mu1, Mu2) are generated in the center portion, and the luminance distribution of the invention may have a more uniform distribution than that of the comparative example, and in particular, it may be seen that it is more uniform without a black pattern in the center portion and the outer circumference of the optical lens.

Figure 14:
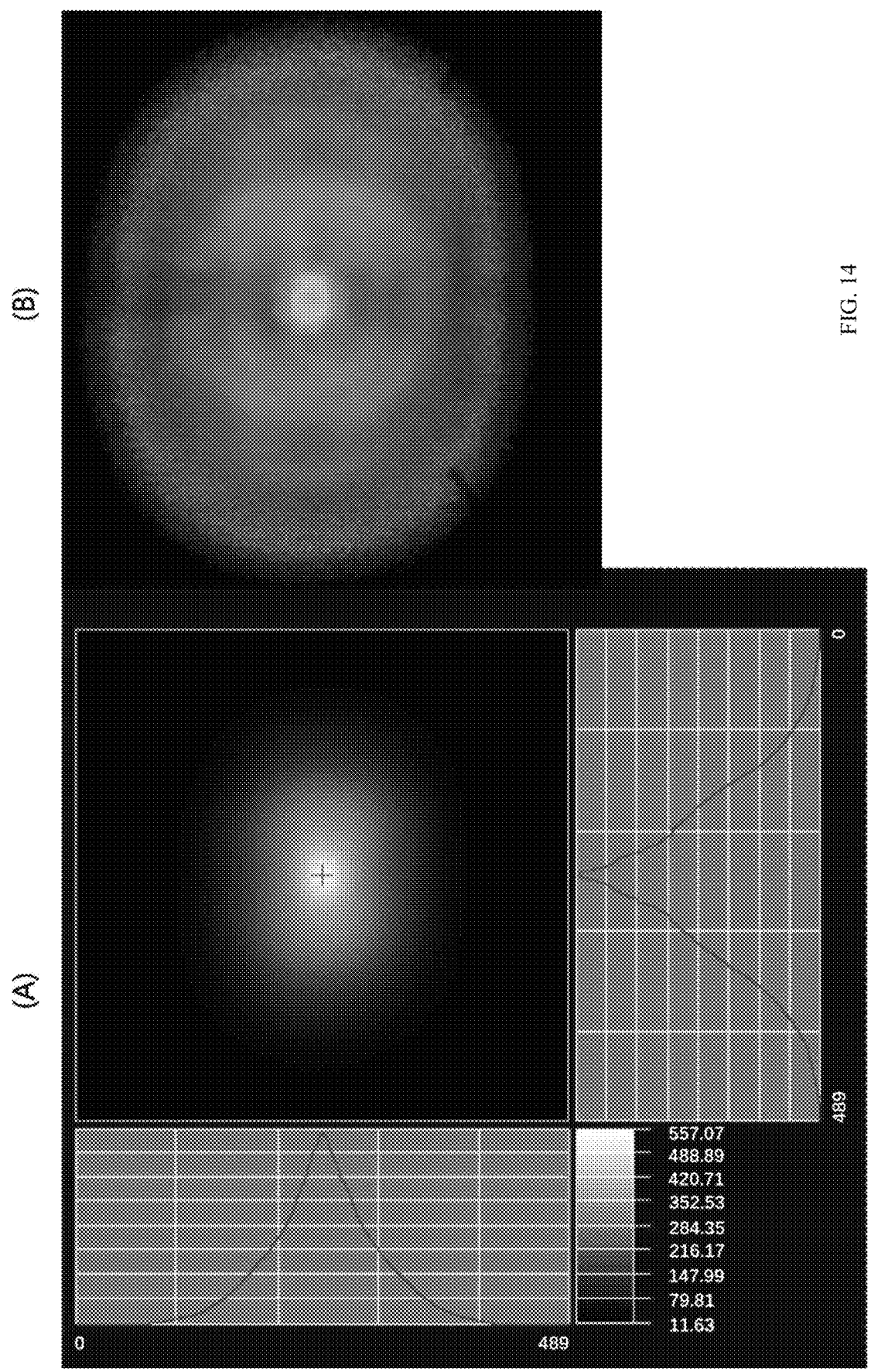
FIG. 14 is a diagram illustrating a luminous intensity graph and a luminance distribution in each axis direction of an optical lens according to an embodiment of the invention.

As shown in FIG. 14, the light emitted by the optical lens of the invention is diffused in the long axis direction, and uniform luminance distribution in the short axis direction and the long axis direction may be provided.

Features, structures, effects, and the like described in the embodiments above are included in at least one embodiment of the invention, and are not necessarily limited to only one embodiment. Furthermore, the features, structures, effects, and the like illustrated in each embodiment may be combined or modified for other embodiments by a person having ordinary knowledge in the field to which the embodiments belong. Therefore, contents related to such combinations and modifications should be interpreted as being included in the scope of the invention.

In addition, although the embodiments have been described above, these are only examples and do not limit the invention, and those of ordinary skill in the field to which the invention belongs are illustrated above within the scope not departing from the essential characteristics of the present embodiment. It will be seen that various modifications and applications that are not available are possible. For example, each component specifically shown in the embodiment can be modified and implemented. And differences related to these modifications and applications should be construed as being included in the scope of the invention defined in the appended claims.

EXPLANATION OF THE REFERENCES

100: light emitting device 300: optical lens
315: recess 320: incident surface
310: bottom surface 330: light exit surface
335: flange portion 351,353: support protrusion
360: side protrusion 400: circuit board
400A: light emitting module P1: convex portion
P2: first reflective pattern P3: second reflective pattern
312: concave portion

What is claimed is:

1. An optical lens comprising:
a bottom surface;
a recess concave in a center region of the bottom surface;
an incident surface around the recess;
a light exit surface for emitting light incident through the incident surface; and
a flange portion disposed between the light exit surface and a second edge of the bottom surface,
wherein a bottom of the recess has a width in a first axis direction that is greater than a width in a second axis direction passing through of a bottom center of the recess,
wherein an outer diameter of the bottom surface has a length in the first axis direction that is smaller than a length in the second axis direction passing through the bottom center of the recess,
wherein the bottom surface includes a first rough region around the recess and second and third rough regions around the first rough region, and a surface roughness of the first rough region has a value smaller than a surface roughness of the second and third rough regions,
wherein the bottom surface includes a first reflective pattern adjacent to the flange portion than the recess,
wherein the incident surface extends in a curved surface from a first edge at a lower end of the incident surface to a first vertex, and
wherein the incidence surface is adjacent to the first vertex than the first edge and includes a convex portion that is convex in an optical axis direction.

2. The optical lens of claim 1,
wherein the first reflective pattern has a plurality of grooves having a curved shape and is disposed in a range of 60% to 80% in a radial direction of the optical lens from a center of the bottom surface,
wherein the first to third rough regions are a corrosion-treated surface,
wherein the second rough region is disposed between the first reflective pattern and the first rough region, and
wherein the third rough region is disposed between the first reflective pattern and the second edge located at a lower end of the flange portion.

3. The optical lens of claim 2, comprising:
a plurality of support protrusions protruding from the bottom surface,
wherein the plurality of support protrusions is disposed closer to the first reflective pattern than the recess.

4. The optical lens of claim 2,
wherein the bottom surface has the lowest first edge at a lower end of the recess and the second edge at a lower end of the flange is higher than the first edge, and
wherein the bottom surface comprises a concave portion along an inside of the first reflective pattern.

5. The optical lens of claim 2,
wherein the light exit surface includes a concave center portion overlapping the bottom of the recess in a vertical direction and a convex curved surface around an outer circumference of the center portion.

6. The optical lens of claim 2,
wherein the convex portion is disposed in a range of 60% to 73% of a depth of the recess,
wherein the convex portions are respectively disposed on both sides in the first axis direction with respect to the optical axis passing through the bottom center of the recess, and
wherein the depth of the recess is formed to be 75% or more of a thickness of the optical lens.

7. The optical lens of claim 2,
wherein a width of the flange portion is a maximum width perpendicular to the outer surface in the first and second axis directions with respect to the optical axis, and
wherein the width of the flange portion gradually decreases as it moves away from the first axis and the second axis along an outer circumferential surface of the flange portion based on an outer surface in the first and second axis directions.

8. The optical lens of claim 2, comprising:
a side protrusion protruding outward from the flange portion in the first axis direction.

9. The optical lens of claim 2,
wherein the flange portion has a second reflective pattern in which a plurality of grooves is arranged in a ring shape around a lower circumference and an outer rough region having a rough surface around an upper circumference, and
wherein a surface roughness of the outer rough region has a value higher than the surface roughness of the first rough region.

10. The optical lens of claim 9, comprising:
a plurality of support protrusions protruding from the bottom surface,
wherein the plurality of support protrusions is disposed closer to the first reflective pattern than the recess.

11. The optical lens of claim 9,
wherein the bottom surface has the lowest first edge at a lower end of the recess and the second edge at a lower end of the flange is higher than the first edge, and
wherein the bottom surface comprises a concave portion along an inside of the first reflective pattern.

12. The optical lens of claim 9,
wherein the light exit surface includes a concave center portion overlapping the bottom of the recess in a vertical direction and a convex curved surface around an outer circumference of the center portion.

13. The optical lens of claim 9,
wherein the convex portion is disposed in a range of 60% to 73% of a depth of the recess,
wherein the convex portions are respectively disposed on both sides in the first axis direction with respect to the optical axis passing through the bottom center of the recess, and
wherein the depth of the recess is formed to be 75% or more of a thickness of the optical lens.

14. The optical lens of claim 9,
wherein a width of the flange portion is a maximum width perpendicular to the outer surface in the first and second axis directions with respect to the optical axis, and
wherein the width of the flange portion gradually decreases as it moves away from the first axis and the second axis along an outer circumferential surface of the flange portion based on an outer surface in the first and second axis directions.

15. The optical lens of claim 9, comprising:
a side protrusion protruding outward from the flange portion in the first axis direction.

16. The optical lens of claim 2,
wherein the bottom surface has an oval shape,
wherein a bottom shape of the recess is an oval shape, and
wherein the first reflective pattern is a discontinuous groove shape or a continuous circular groove shape.

17. The optical lens of claim 16, comprising:
a plurality of support protrusions protruding from the bottom surface,
wherein the plurality of support protrusions is disposed closer to the first reflective pattern than the recess.

18. The optical lens of claim 16,
wherein the bottom surface has the lowest first edge at a lower end of the recess and the second edge at a lower end of the flange is higher than the first edge, and
wherein the bottom surface comprises a concave portion along an inside of the first reflective pattern.

19. The optical lens of claim 16,
wherein the light exit surface includes a concave center portion overlapping the bottom of the recess in a vertical direction and a convex curved surface around an outer circumference of the center portion.

20. The optical lens of claim 16,
wherein the convex portion is disposed in a range of 60% to 73% of a depth of the recess,
wherein the convex portions are respectively disposed on both sides in the first axis direction with respect to the optical axis passing through the bottom center of the recess, and
wherein the depth of the recess is formed to be 75% or more of a thickness of the optical lens.

21. The optical lens of claim 16,
wherein a width of the flange portion is a maximum width perpendicular to the outer surface in the first and second axis directions with respect to the optical axis, and
wherein the width of the flange portion gradually decreases as it moves away from the first axis and the second axis along an outer circumferential surface of the flange portion based on an outer surface in the first and second axis directions.

22. The optical lens of claim 16, comprising:
a side protrusion protruding outward from the flange portion in the first axis direction.

23. A light emitting module comprising:
a circuit board;
a plurality of light emitting devices disposed on the circuit board and emitting light; and
a plurality of optical lenses arranged along the circuit board and disposed on each of the plurality of light emitting devices,
wherein the circuit board has a width in a second axis direction less than a length in a first axis direction,
wherein each of the optical lenses is the optical lens of claim 2,
wherein the plurality of optical lenses is arranged along the first axis direction of the circuit board,
wherein the width of the circuit board in the second axis direction is smaller than a length of each of the optical lenses in the second axis direction, and
wherein a part of the first reflective pattern is exposed outside of the circuit board in a second axis direction.

24. The light emitting module of claim 23,
wherein the bottom surface of the optical lens is an oval shape,
wherein a bottom shape of the recess is an oval shape, and
wherein the first reflective pattern has a continuous or discontinuous groove shape,
wherein the optical lens includes a plurality of support protrusions protruding from the bottom surface, and
wherein the plurality of support protrusions is disposed closer to the first reflective pattern than the recess.

25. The light emitting module of claim 24,
wherein the bottom surface of the optical lens has the lowest first edge at a lower end of the recess and the second edge at the lower end of the flange portion is disposed higher than the first edge,
wherein the circuit board has a reflective layer thereon, and
wherein a distance between the first edge of the bottom surface and the circuit board is minimum, and a distance between the second edge of the bottom surface and the circuit board is maximum.

26. The light emitting module of claim 25,
wherein the light exit surface of the optical lens includes a concave center portion overlapping the bottom of the recess in a vertical direction and a convex curved surface around an outer circumference of the center portion, wherein the convex portion of the optical lens is disposed in a range of 60% to 73% of a depth of the recess of the optical lens, wherein the convex portions are opposed to each other at both sides in the first axis direction with respect to the optical axis passing through the center of the bottom of the recess, and wherein the depth of the recess is formed to be 75% or more of a thickness of the optical lens.

27. The light emitting module of claim 25, comprising:

a side protrusion protruding outward from the flange portion in the first axis direction, wherein the flange portion of the optical lens has a second reflective pattern in which a plurality of grooves is arranged in a ring shape around a lower circumference thereof and an outer rough region having a rough surface around an upper circumference thereof, and wherein a surface roughness of the outer rough region is higher than that of the first rough region disposed on a bottom surface of the optical lens.

28. A light emitting module comprising:

a circuit board;

a plurality of light emitting devices disposed on the circuit board and emitting light; and a plurality of optical lenses arranged along the circuit board and disposed on each of the plurality of light emitting devices, wherein the circuit board has a width in a second axis direction less than a length in a first axis direction, wherein each of the optical lenses is the optical lens of claim 1, wherein the plurality of optical lenses is arranged along the first axis direction of the circuit board, wherein the width of the circuit board in the second axis direction is smaller than a length of each of the optical lenses in the second axis direction, and wherein a part of the first reflective pattern is exposed outside of the circuit board in a second axis direction.

29. The light emitting module of claim 28, wherein the bottom surface of the optical lens is an oval shape, wherein a bottom shape of the recess is an oval shape, and wherein the first reflective pattern has a continuous or discontinuous groove shape, wherein the optical lens includes a plurality of support protrusions protruding from the bottom surface, and wherein the plurality of support protrusions is disposed closer to the first reflective pattern than the recess.

30. The light emitting module of claim 29, wherein the bottom surface of the optical lens has the lowest first edge at a lower end of the recess and the second edge at the lower end of the flange portion is disposed higher than the first edge, wherein the circuit board has a reflective layer thereon, and wherein a distance between the first edge of the bottom surface and the circuit board is minimum, and a distance between the second edge of the bottom surface and the circuit board is maximum.

31. The light emitting module of claim 30, wherein the light exit surface of the optical lens includes a concave center portion overlapping the bottom of the recess in a vertical direction and a convex curved surface around an outer circumference of the center portion, wherein the convex portion of the optical lens is disposed in a range of 60% to 73% of a depth of the recess of the optical lens, wherein the convex portions are opposed to each other at both sides in the first axis direction with respect to the optical axis passing through the center of the bottom of the recess, and wherein the depth of the recess is formed to be 75% or more of a thickness of the optical lens.

32. The light emitting module of claim 30, comprising:

a side protrusion protruding outward from the flange portion in the first axis direction, wherein the flange portion of the optical lens has a second reflective pattern in which a plurality of grooves is arranged in a ring shape around a lower circumference thereof and an outer rough region having a rough surface around an upper circumference thereof, and wherein a surface roughness of the outer rough region is higher than that of the first rough region disposed on a bottom surface of the optical lens.

* * * * *